United States Patent [19]
Shirasaka et al.

[11] Patent Number: 5,452,372
[45] Date of Patent: Sep. 19, 1995

[54] IMAGE PROCESSING APPARATUS

[75] Inventors: Akifumi Shirasaka; Kensaku Tanaka, both of Yokohama; Masaki Hamada, Tokyo, all of Japan

[73] Assignee: Canon Kabushiki Kaisha, Tokyo, Japan

[21] Appl. No.: 347,172

[22] Filed: Nov. 22, 1994

Related U.S. Application Data

[60] Continuation of Ser. No. 62,152, May 17, 1993, abandoned, which is a continuation of Ser. No. 771,868, Oct. 8, 1991, abandoned, which is a division of Ser. No. 311,762, Feb. 17, 1989, abandoned, which is a continuation of Ser. No. 148,712, Jan. 26, 1988, Pat. No. 4,837,847.

[30] Foreign Application Priority Data

| Feb. 3, 1987 | [JP] | Japan | 62-23856 |
| Feb. 10, 1987 | [JP] | Japan | 62-29043 |
| Jun. 30, 1987 | [JP] | Japan | 62-160999 |
| Jun. 30, 1987 | [JP] | Japan | 62-161000 |

[51] Int. Cl.⁶ ............................................. G06K 9/48
[52] U.S. Cl. ....................................... 382/199; 382/258
[58] Field of Search ................. 382/22, 33, 54, 55

[56] References Cited

U.S. PATENT DOCUMENTS

| 3,987,412 | 10/1976 | Morrin, II | 382/55 |
| 4,110,736 | 8/1978 | Kono | 382/22 |
| 4,466,123 | 8/1984 | Arai et al. | 382/55 |
| 4,477,926 | 10/1984 | Linger et al. | 382/8 |
| 4,493,855 | 4/1985 | Bishop et al. | 382/54 |
| 4,748,443 | 5/1988 | Uehara et al. | 382/55 |
| 4,754,488 | 6/1988 | Lyke | 382/22 |
| 4,855,933 | 8/1989 | Kondo | 382/55 |
| 4,905,166 | 2/1990 | Schuerman | 382/55 |

Primary Examiner—Yon J. Couso
Attorney, Agent, or Firm—Fitzpatrick, Cella, Harper & Scinto

[57] ABSTRACT

An image processing apparatus for correcting shape errors when a graphic image to which contour line data was given is painted and developed comprises: an input device to input contour line data of image information; a circuit to make a contour line pattern of the image information on the basis of the contour line data; a circuit to make a painted pattern in which the inside of the contour line pattern was painted; a circuit to narrow the painted pattern; and a contour line correcting circuit to obtain the exclusive-OR combination of the narrowed painted pattern and the contour line pattern. The contour line pattern is eliminated from the painted pattern by the narrowing circuit. The contour line correcting circuit has a converter to convert the contour line pattern in correspondence to the drawing direction of the contour line pattern and obtains the exclusive-OR combination of the converted contour line pattern and the painted pattern. This apparatus can prevent a small blank region in an image being painted over and can effect a feature of a contour line.

8 Claims, 22 Drawing Sheets

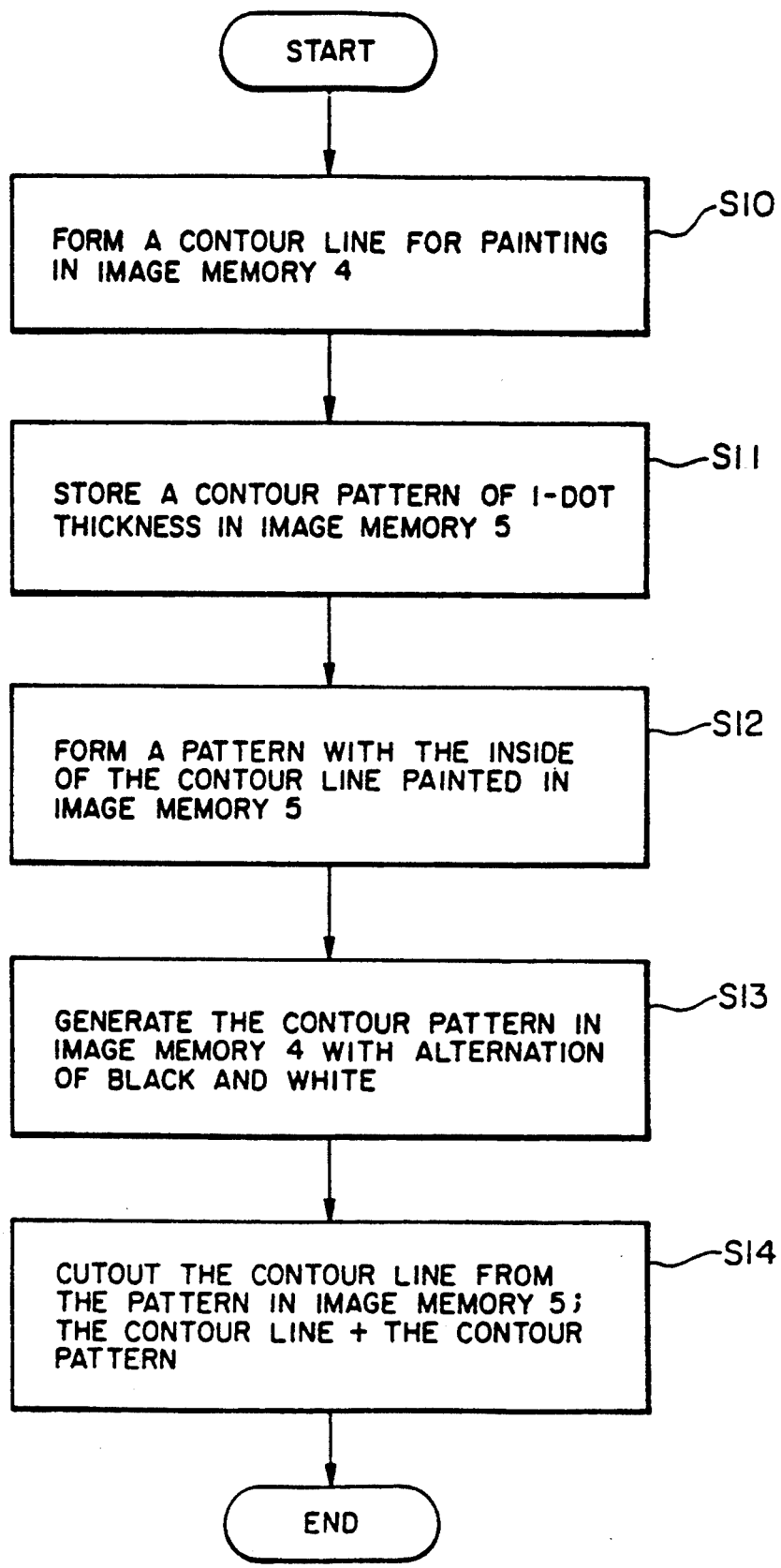

IMAGE PROCESSING APPARATUS

This application is a continuation of application Ser. No. 08/062,152, filed May 17, 1993, now abandoned which is a continuation of application Ser. No. 07/771,868, filed Oct. 8, 1991, abandoned, which is a division of application Ser. No. 07/311,762, filed Feb. 17, 1989, abandoned, which is a continuation of application Ser. No. 07/148,712, filed Jan. 26, 1988, now U.S. Pat. No. 4,837,847.

BACKGROUND OF THE INVENTION

1. Field of the Invention

The present invention relates to an image processing apparatus and, more particularly, to an image processing apparatus for correcting a shape error when painting and developing a graphic image for which contour data is given.

2. Related Background Art

Hitherto, in an image processing apparatus, when contour data is developed into a dot pattern and drawn in an internal memory such as a display memory or the like, the coordinate values of the contour line which are given as real number values are simply converted into the coordinate values corresponding to the accuracy such as addresses or the like in the memory in which, for example, its dot pattern is developed and the inside of the contour line is painted or the like, whereby the shape is drawn.

Therefore, when the inside of the contour line is all filled (painted) in black, if the inside of the contour line is simply filled by dots, there is a problem that the contour line of the original graphic image is extinguished and the feature of this graphic image is eliminated. Further, as shown in FIG. 39(a), in blank portions 80 and 81 in which graphic images are closely arranged, when they are reduced, the blank portions 80 and 81 disappear as shown in FIG. 39(b), so that the graphic images are painted.

SUMMARY OF THE INVENTION

The present invention is made in consideration of the foregoing conventional example and it is an object of the invention to provide an image processing apparatus which can prevent that the area having a small image blank portion is painted, thereby effecting the feature of the contour line.

BRIEF DESCRIPTION OF THE DRAWINGS

FIG. 17 is a flow chart for other contour correcting processes according to the second embodiment;

DETAILED DESCRIPTION OF THE PREFERRED EMBODIMENTS

First Embodiment

The suitable first embodiment of the present invention will be described in detail hereinbelow with reference to the drawings.

Figure 1:
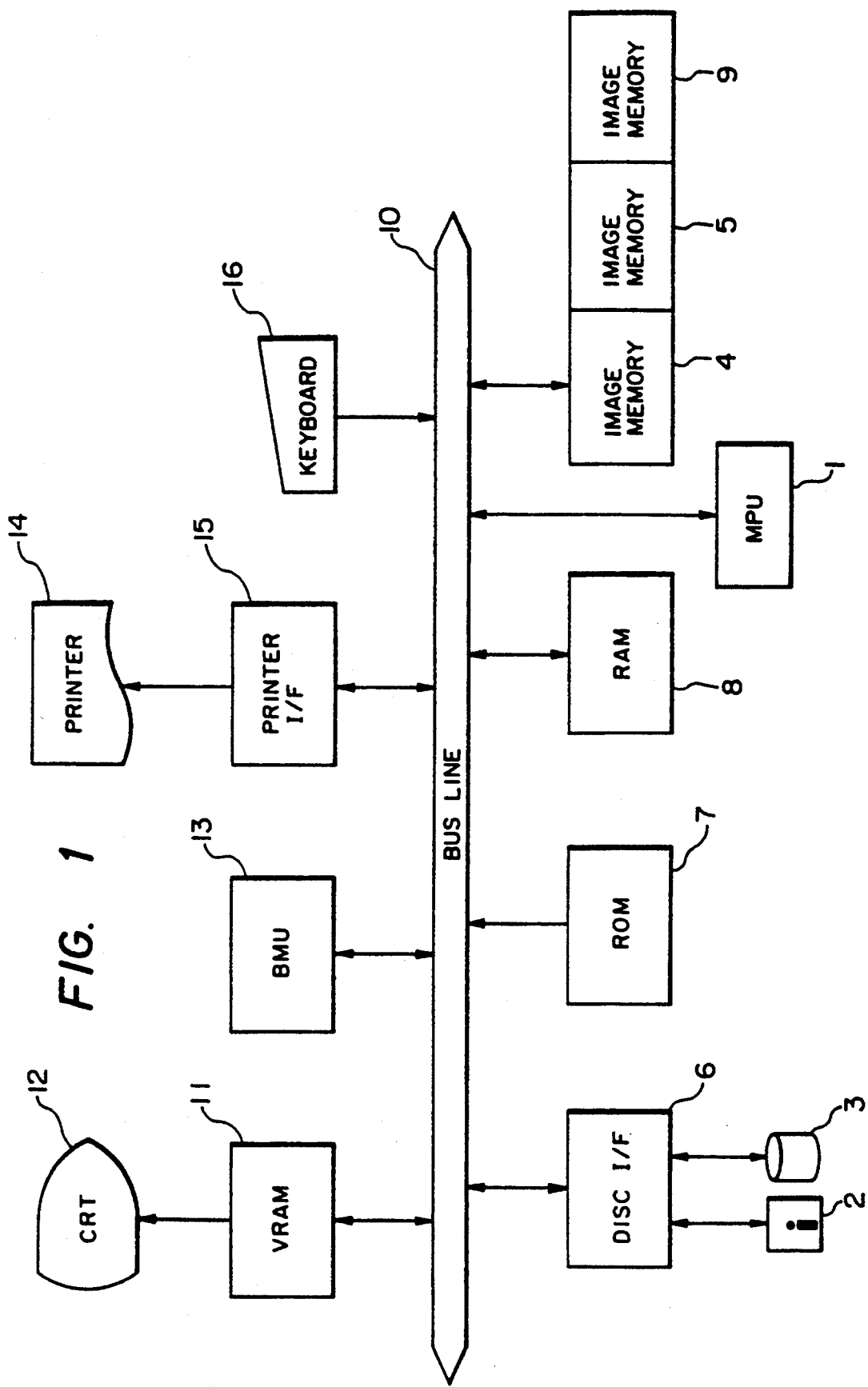
FIG. 1 is a block diagram showing a schematic construction of an image processing apparatus according to one preferred embodiment.

FIG. 1 is a block diagram showing a schematic constitution of an image processing apparatus in the first embodiment.

Figure 2:
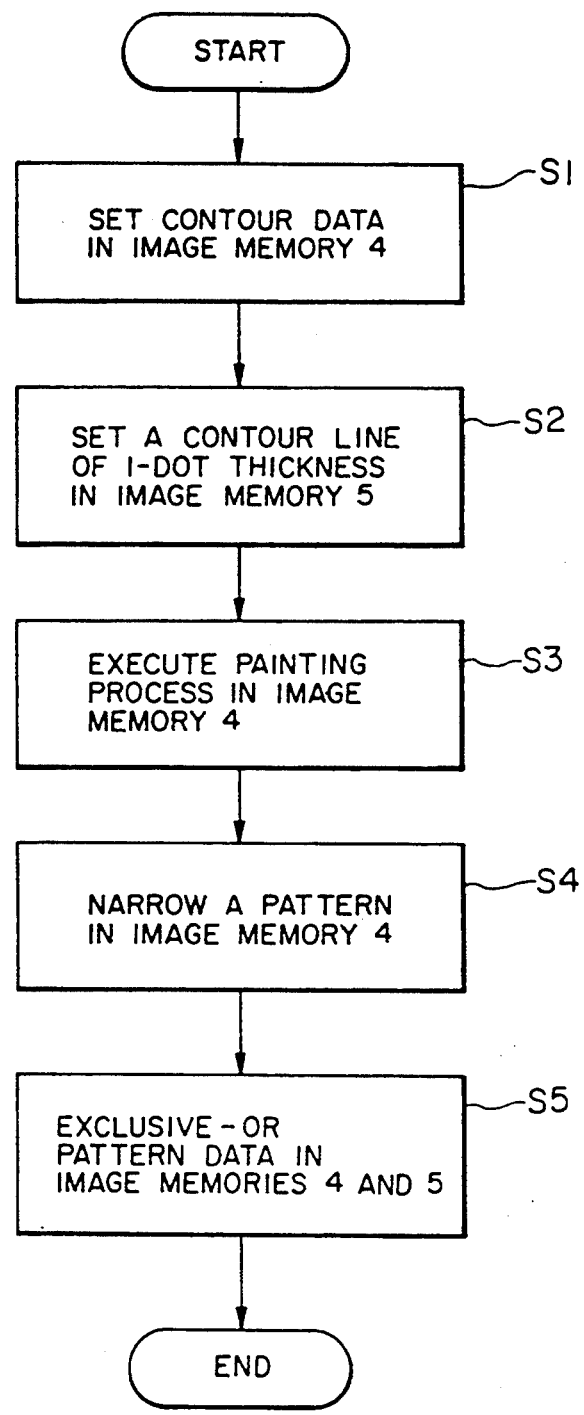
FIG. 2 is a flowchart for contour correcting processes in the first embodiment of the present invention.

In the diagram, reference numeral 1 denotes an MPU (microprocessor unit) such as, e.g., a microprocessor or the like for controlling the whole apparatus in accordance with a control program in an ROM 7 shown by a flowchart of FIG. 2. Numerals 2 and 3 denote a floppy disc unit and a hard disc unit for storing document data, image data, or the like, respectively. These floppy and hard disc units 2 and 3 are connected to a system bus 10 through a disc interface 6. Numerals 4, 5, and 9 represent image memories having substantially the same memory capacity. Pattern data can be pattern developed as a dot pattern and the image data can be transferred to a video memory 11 and displayed on a CRT or output to a printer 14 through a printer interface 15.

Numeral 7 denotes a ROM to store the control program for the MPU 1 and data, and 8 indicates a RAM which is used as a work area of the MPU 1 and temporarily stores character data and other various kinds of data which are input from the system bus 10. Numeral 11 denotes the video memory (VRAM) to store bit map data which is output and displayed by a CRT 12. The VRAM 11 can directly receive the image data from the image memory 4, 5, or 9 and store and display on the CRT 12.

A bit manipulation unit (BMU) 13 operates the bit data in the image memory 4, 5, or 9 or video memory 11 and also has the function of DMA transfer among those memories. The printer 14 prints and outputs a dot image on the basis of the dot data sent through the printer interface 15. The printer 14 can also print on the basis of the image data from the image memory 4, 5, or 9, RAM 8, or video memory (VRAM) 11. Numeral 16 denotes a keyboard to input various kinds of data and instruction data.

FIG. 2 is a flowchart for contour correcting processes in the first embodiment.

A contour line is first drawn in the image memory 4 in step S1. A contour line may be made on the basis of the coordinate values input from the keyboard 16 or the like or may be also made on the basis of the image data input from the disc 2 or 3. In step S2, the data in which a thickness of contour line is set to the value corresponding to one dot among the output dots of the CRT 12 or printer 14 is made in the image memory 5. This data is shown as a contour line pattern in FIG. 3.

Figure 4:
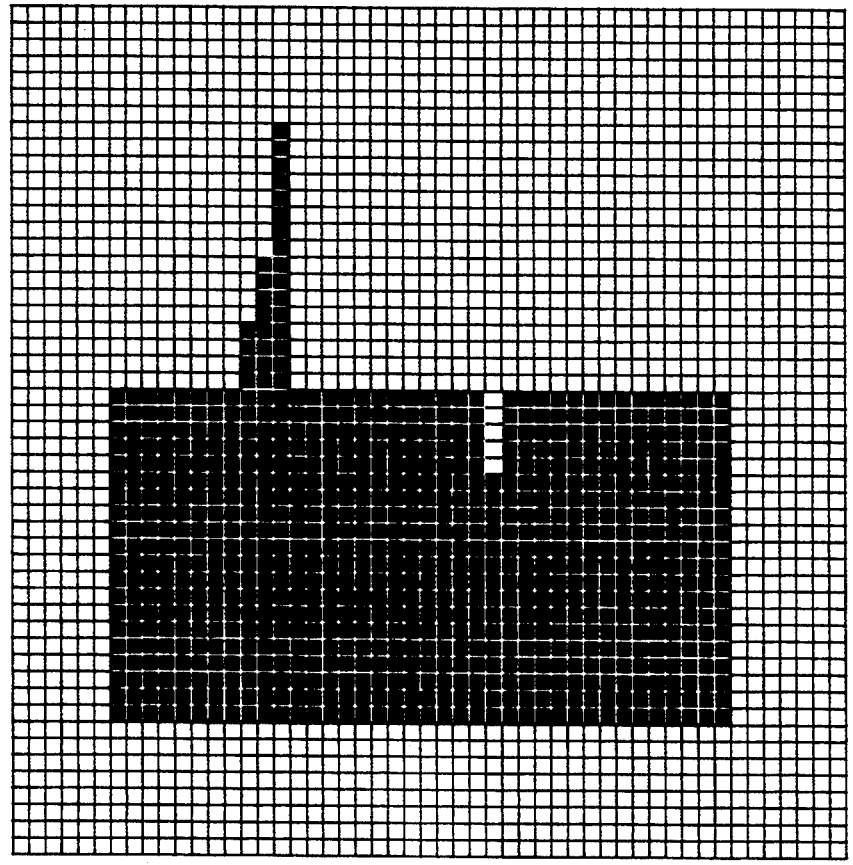
FIG. 4 is a diagram showing a figure in which the inside of the contour line shown in FIG. 3 was painted.

In the next step S3, the inside of the contour line in the image memory 4 is painted to thereby obtain pattern data shown in FIG. 4. In step S4, the painted pattern in the image memory 4 shown in FIG. 4 is narrowed. This narrowing process is performed by reducing the pattern one dot by one along the outer periphery of the painted pattern (the resultant image is shown in FIG. 5).

Figure 3:
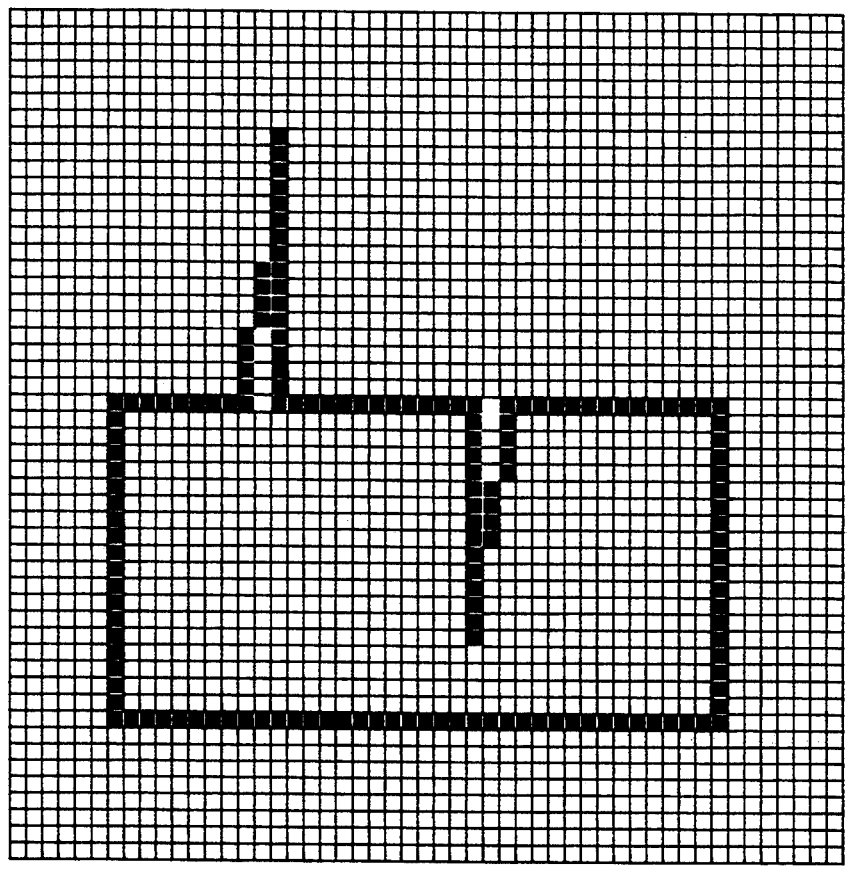
FIG. 3 is a diagram showing an example of a contour line pattern to be corrected.
Figure 5:
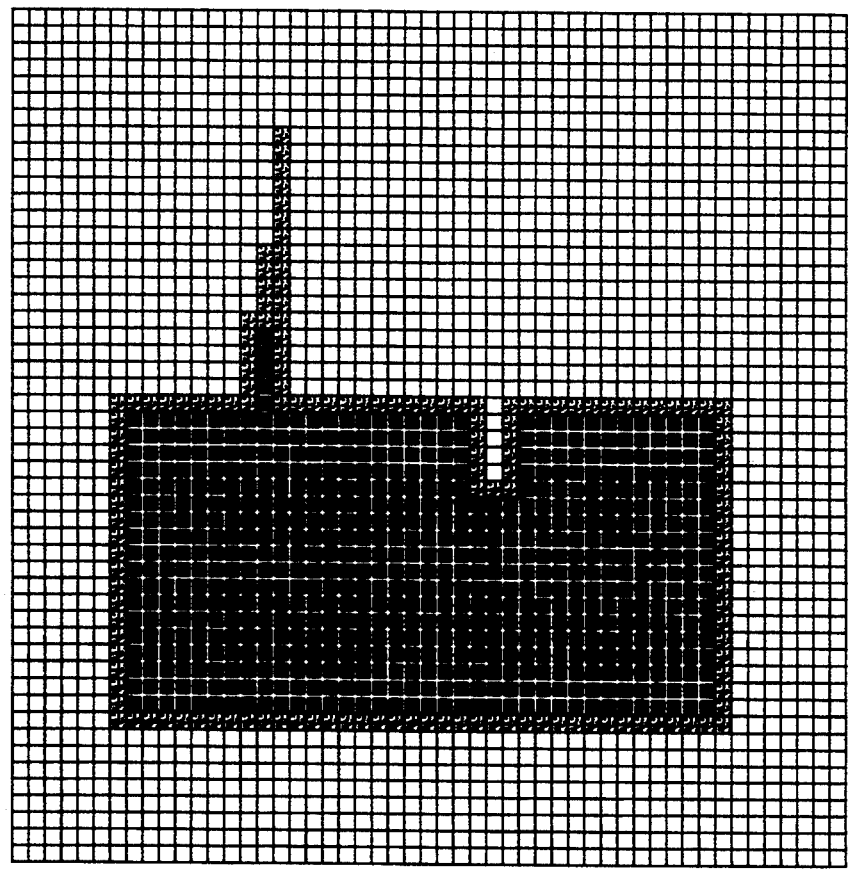
FIG. 5 is a diagram showing a figure obtained by narrowing the figure of FIG. 4.
Figure 6:
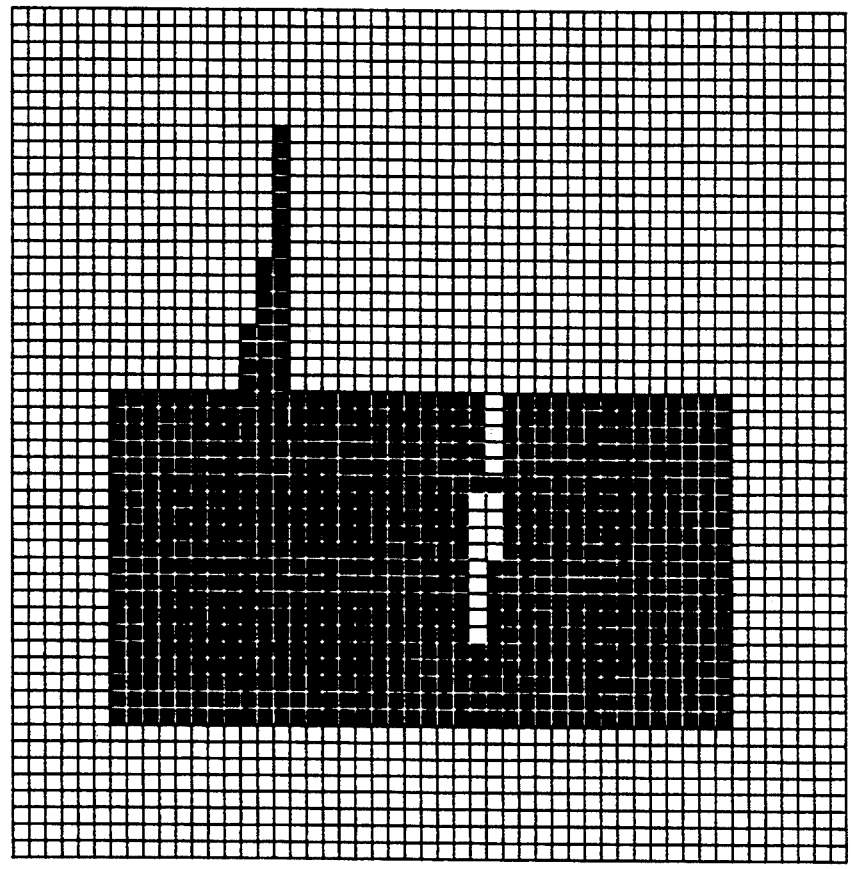
FIG. 6 is a diagram showing a figure obtained by exclusive-OR processing of the contour line pattern in FIG. 3 and the painted pattern in FIG. 4.

In step S5, the exclusive-OR combination of the narrowed pattern shown in FIG. 5 and the contour line pattern shown in FIG. 3 is calculated, thereby obtaining pattern data shown in FIG. 6. Due to this, it will be understood from the pattern in FIG. 6 as compared with the painted pattern in FIG. 4 that a feature of the contour line shown in FIG. 3 is clearly expressed.

Figure 7:
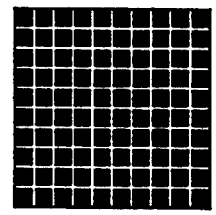
FIGS. 7 and 8 are diagrams showing examples of corrected patterns of contour line patterns.
Figure 8:
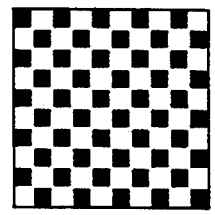
Figure 9:
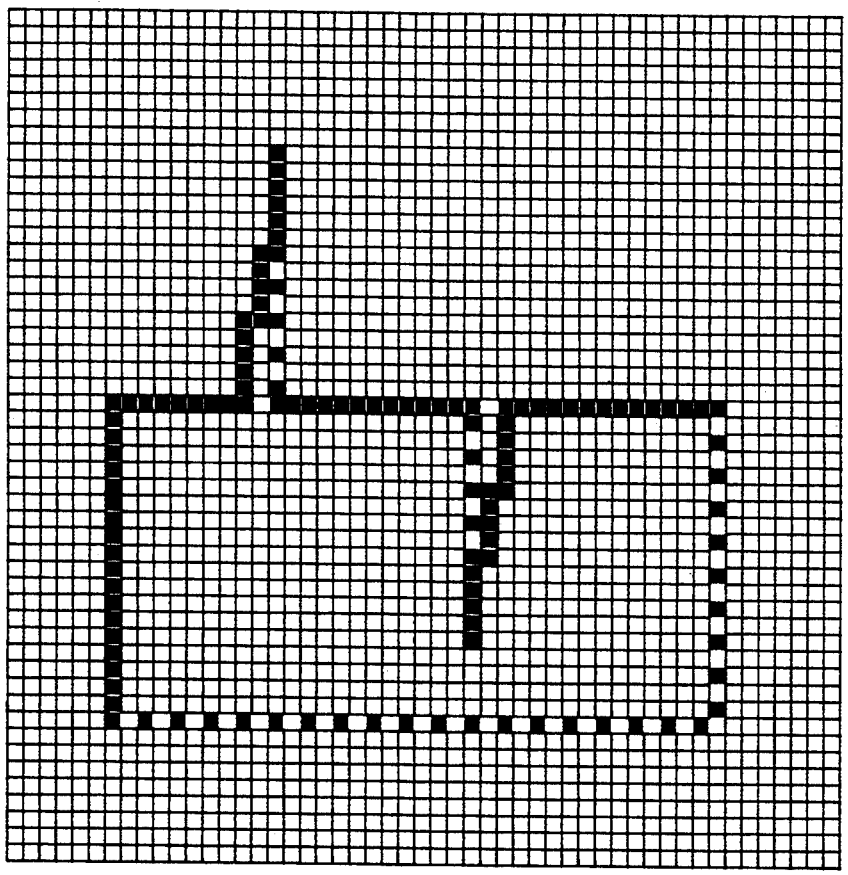
FIG. 9 is a diagram showing an example of a contour line pattern converted by the first embodiment.

In the first embodiment, when a drawing direction $\psi$ of the contour line in FIG. 3 lies within a range of $\alpha \leq \psi < \alpha + 180°$ ($\alpha$ is set to 0° in this example), the contour line is constituted by a dot pattern in FIG. 7. When the $\psi$ lies within a range of $\alpha + 180° < \psi < \alpha + 360°$, a pattern shown in FIG. 9 is derived by drawing the contour line by a dot pattern in FIG. 8.

Figure 10:
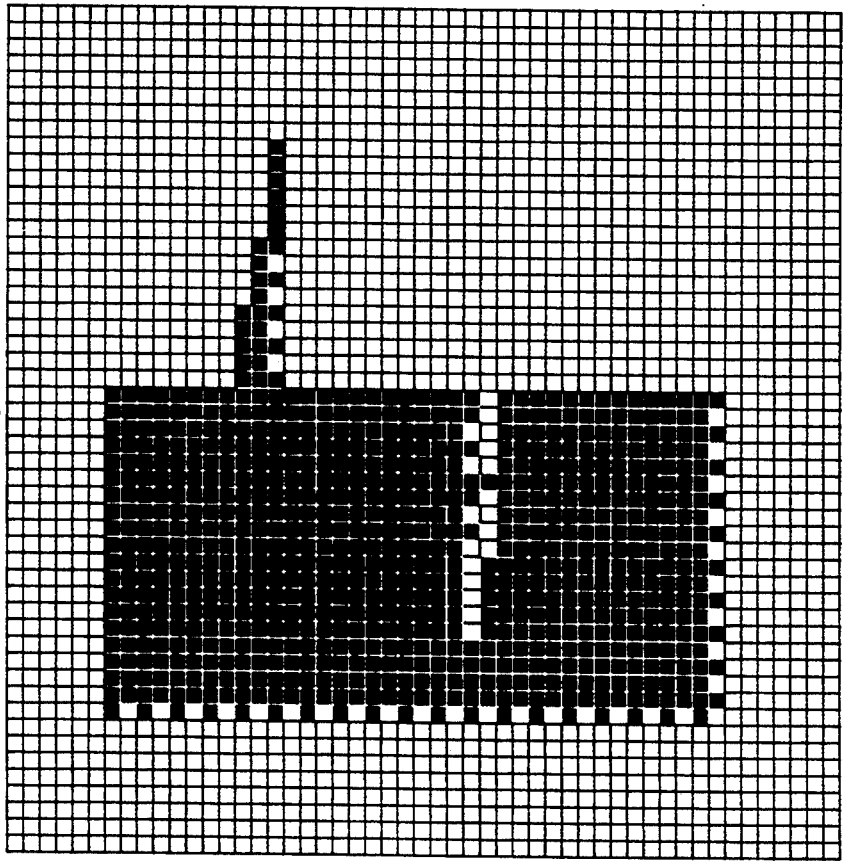
FIG. 10 is a diagram showing a pattern obtained by exclusive-OR processing of the contour line pattern in FIG. 9 and the painted pattern in FIG. 4.

By calculating the exclusive-OR combination of the contour line pattern and the narrow pattern in FIG. 5, a pattern shown in FIG. 10 is derived.

In this case, a feature of the contour line shown in FIG. 3 is clearly expressed in a manner similar to the case of FIG. 6 and an effect similar to that in the foregoing embodiment is also obtained.

It is sufficient to properly switch or select the foregoing contour line patterns in accordance with the resolution, size of the output dots, or the like of the output apparatus.

In the above embodiment, a mesh pattern in which the ratio of black and white is 1:1 has been shown as an example of the hatching corresponding to the drawing direction of the contour line. However, the invention is not limited to this example but the mesh pattern may be also properly set in accordance with the resolution, thickness of output points, or the like, of the output apparatus.

Second Embodiment

Since the block diagram of an image processing apparatus according to the second embodiment is the same as for the first embodiment, its description is omitted.

Contour correcting processes according to the second embodiment will now be described hereinbelow.

Figure 11:
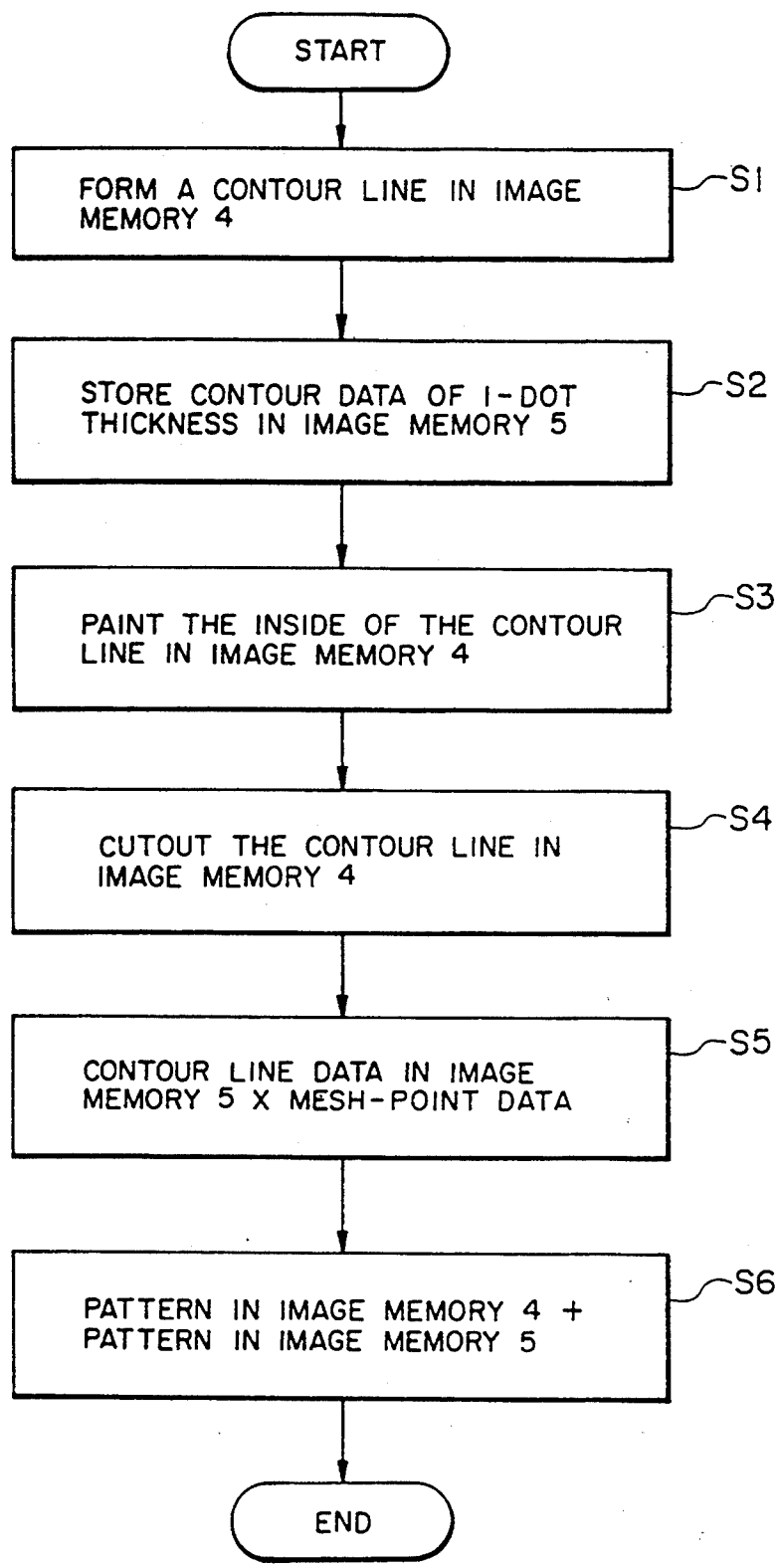
FIG. 11 is a flowchart for contour correcting processes in second embodiment of the invention.

FIG. 11 is a flowchart for contour correcting processes in the second embodiment.

Figure 12:
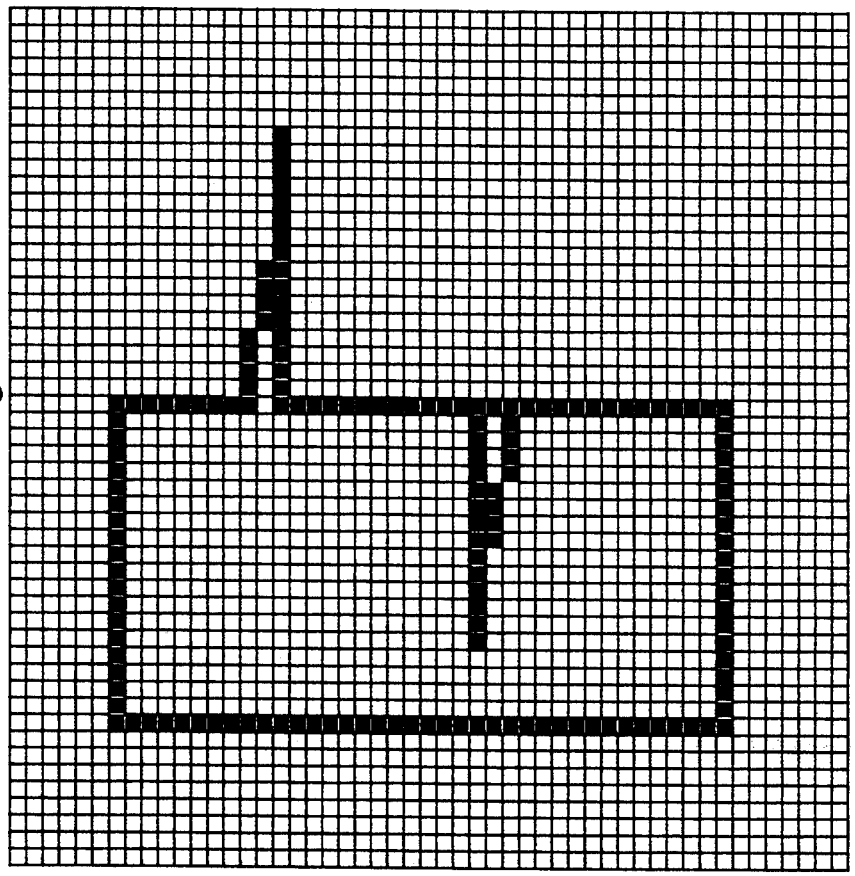
FIG. 12 is a diagram showing an example of a contour line pattern to be corrected.

A contour line is first drawn in the image memory 4 in step S1. A contour line may be made on the basis of the coordinate values input from the keyboard 16 or the like or may be also made on the basis of the image data input from the disc 2 or 3. In step S2, the data in which a thickness of contour line is set to the value corresponding to one dot among the output dots of the CRT 12 or printer 14 is made in the image memory 5. The resultant data is shown as a contour line pattern in FIG. 12.

Figure 13:
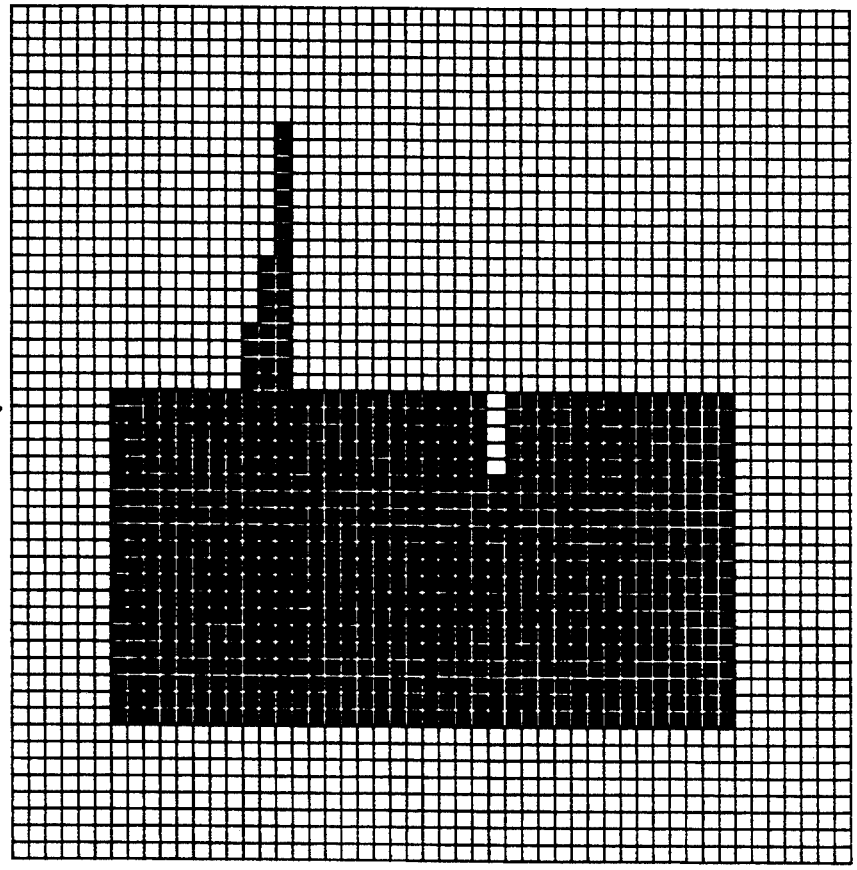
FIG. 13 is a diagram showing a figure in which the inside of the contour line shown in FIG. 12 was painted.
Figure 14:
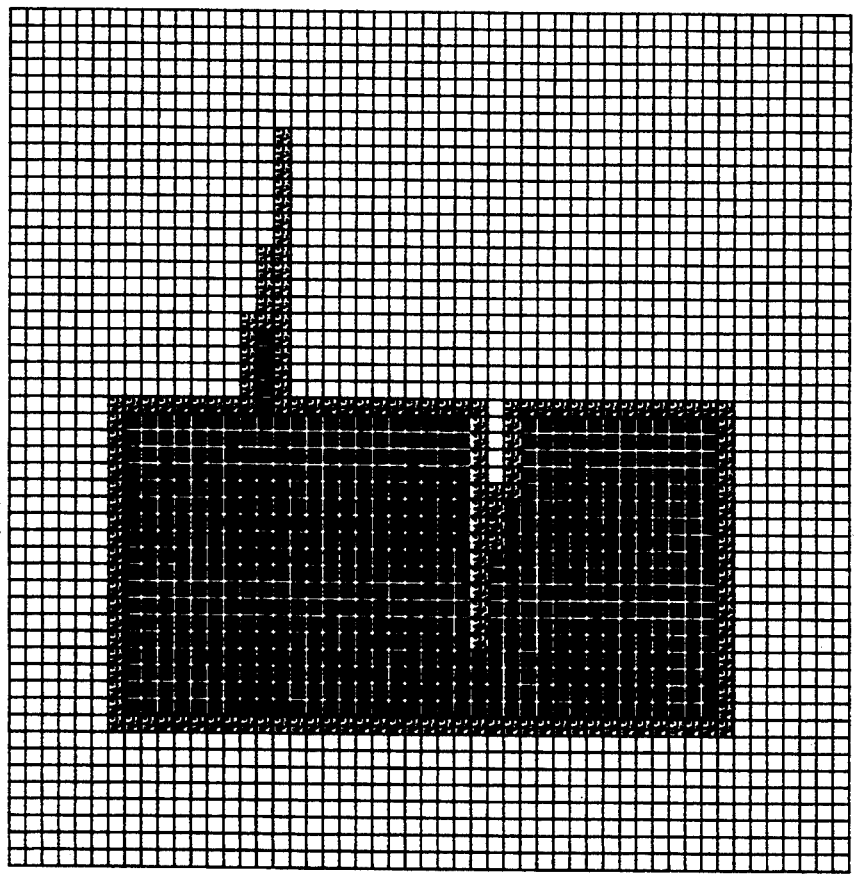
FIG. 14 is a diagram showing a figure obtained by eliminating the contour line from the figure in FIG. 13.

In the next step S3, the inside of the contour line in the image memory 4 is painted, thereby obtaining pattern data shown in FIG. 13. In step S4, the AND of the inverted data of the contour line pattern in the image memory 5 shown in FIG. 12 and the painted data in the image memory 4 is calculated. The resultant image data of the AND is stored into the image memory 4. This image data is shown as pattern data in FIG. 14.

Figure 15:
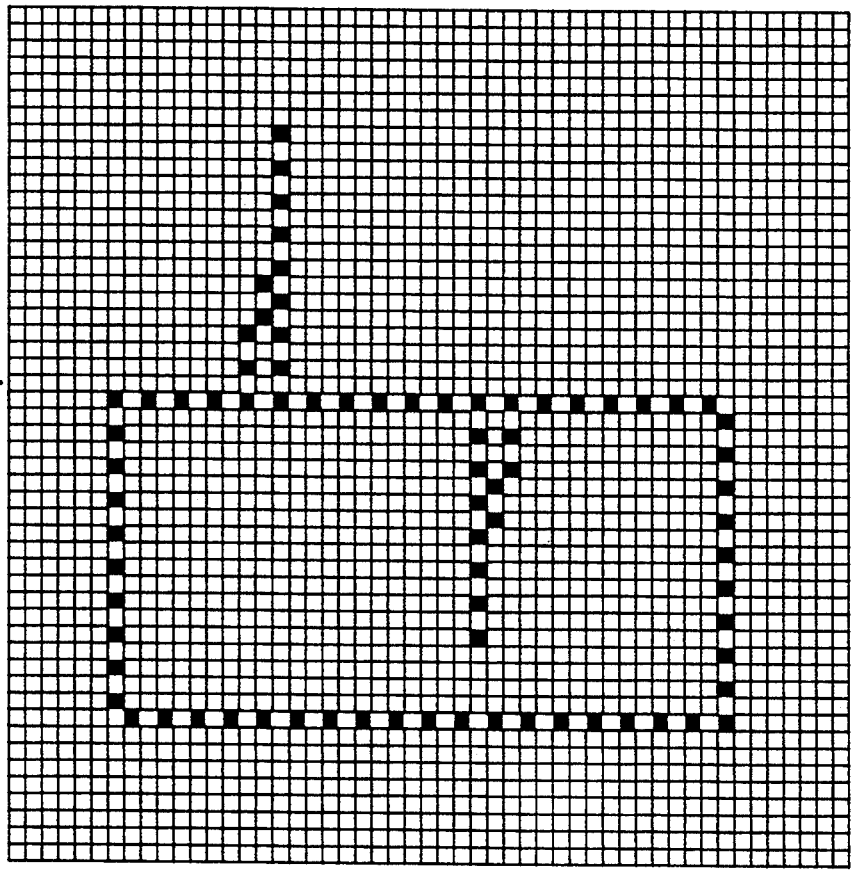
FIG. 15 is a diagram showing a contour line obtained by adding a mesh to the contour line pattern in FIG. 12.
Figure 16:
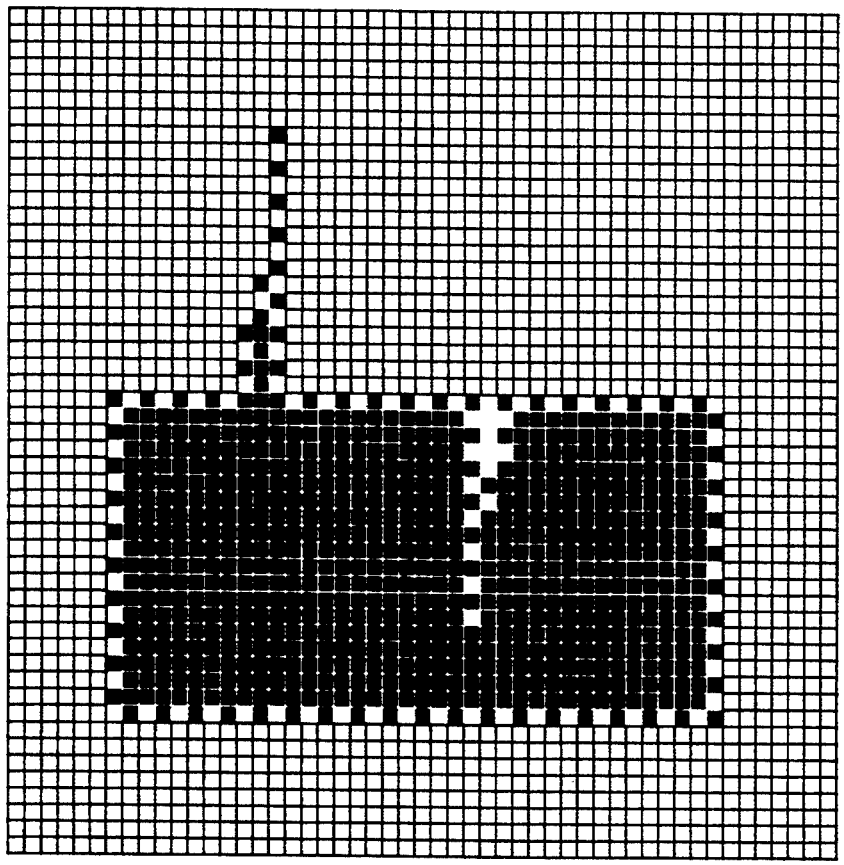
FIG. 16 is a diagram showing a figure obtained by correcting the contour of the pattern in FIG. 13.

In the next step S5, the product of the contour line pattern in the image memory 5 and the mesh-point pattern developed in the RAM 8 is calculated to obtain a mesh-point pattern of a contour line as shown in FIG. 15. This pattern is stored into the image memory 5. The OR of the mesh-point pattern in FIG. 15 which was developed in the image memory 5 and the pattern data in FIG. 4 which was developed in the image memory 4 is calculated in step S6, so that a pattern shown in FIG. 16 is obtained. According to the pattern data in FIG. 16, the contour of the pattern in which the inside of the contour line in FIG. 13 was painted is visually falsely corrected and the painting of the cut-out portion of the contour line is visually corrected.

FIG. 17 is a flowchart for other contour correcting processes according to the second embodiment.

Figure 18:
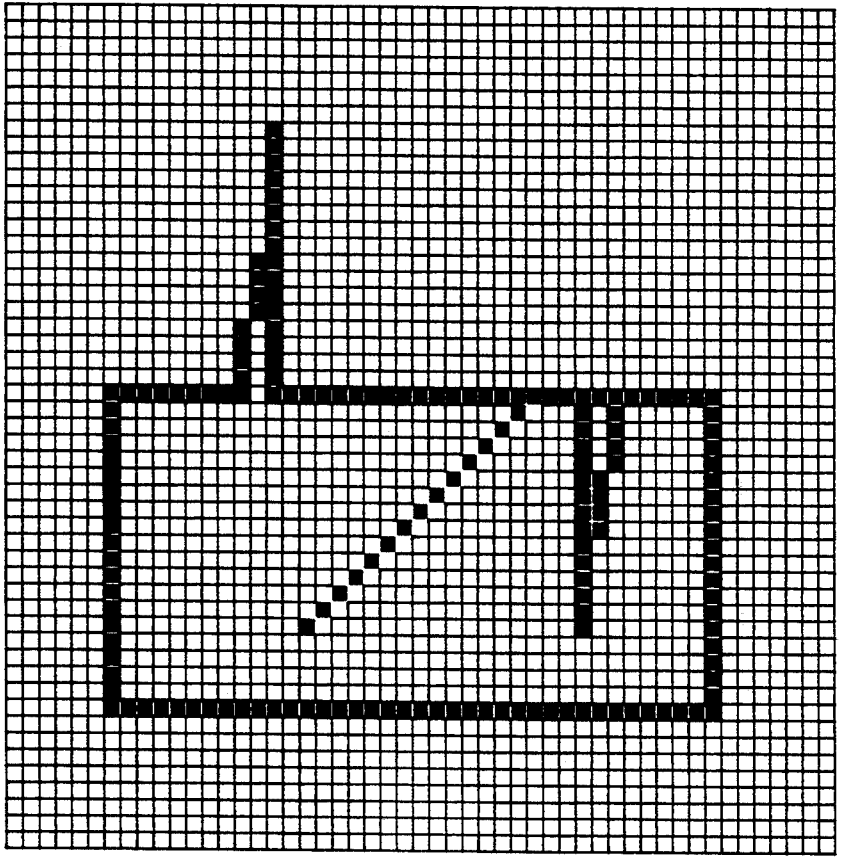
FIG. 18 is a diagram showing an example of a contour line pattern to be corrected.

In step S10, a contour line for painting is first drawn in the image memory 4 (refer to FIG. 18) in a manner similar to step S1 in FIG. 11. In step S11, a contour line pattern whose thickness corresponds to one dot is stored into the image memory 5. In step S12, a pattern in which the inside of the contour line in the image memory 5 was painted is made as shown in FIG. 19.

Figure 20:
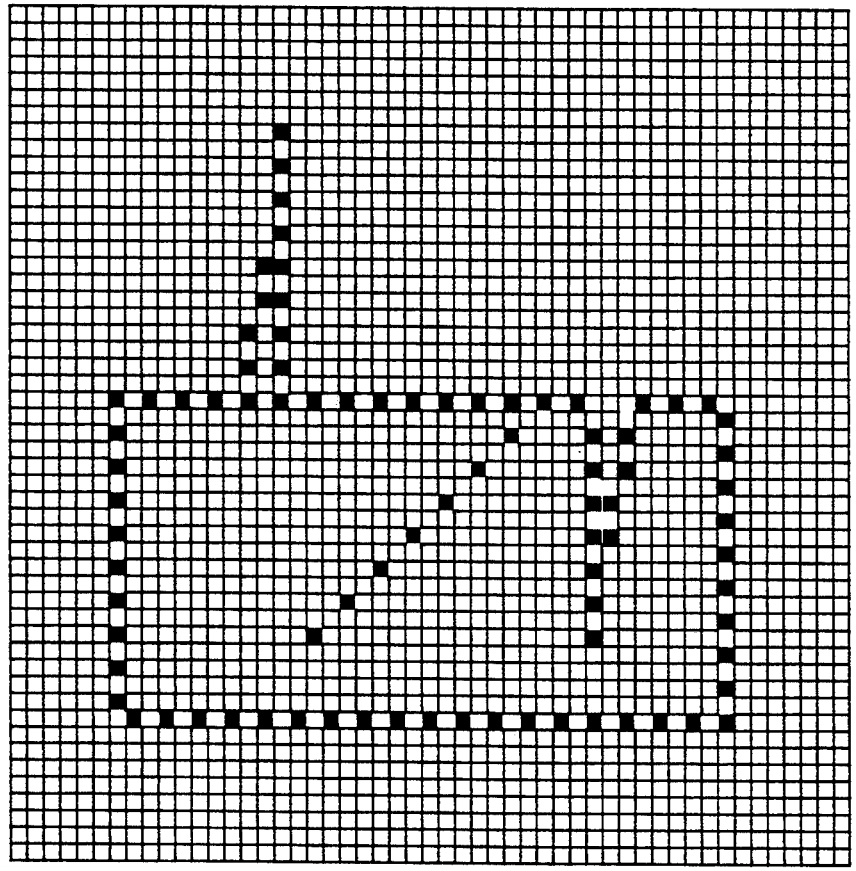
FIG. 20 is a diagram in the case where the contour line pattern in FIG. 19 was generated with alternation of black and white.
Figure 21:
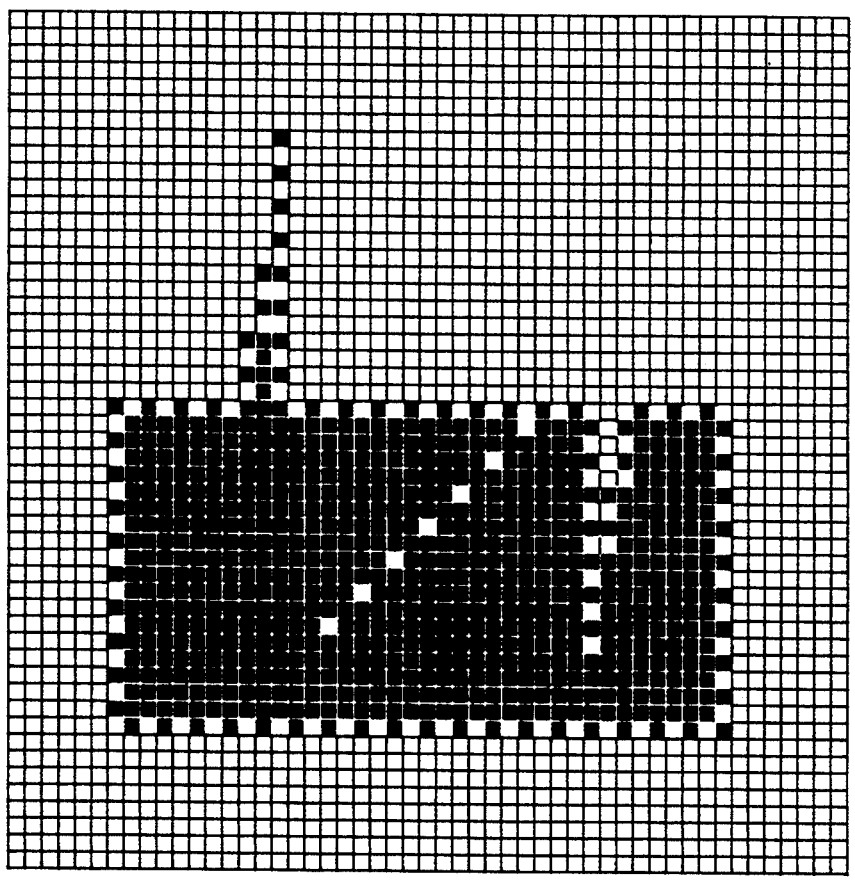
FIG. 21 is a diagram showing an example in the case where the contour of the pattern in FIG. 19 was corrected.

In step S13, a pattern in which the contour line pattern in the image memory 4 was generated with alternation of black and white is obtained (refer to FIG. 20). In step S14, in a manner similar to steps S4 and S6 in FIG. 11, the contour line portion of the pattern in the image memory 5 is extracted and the OR of this portion and the contour line pattern developed in the image memory 4 which was obtained in step S13 is calculated. The resultant pattern is shown in FIG. 21.

Figure 19:
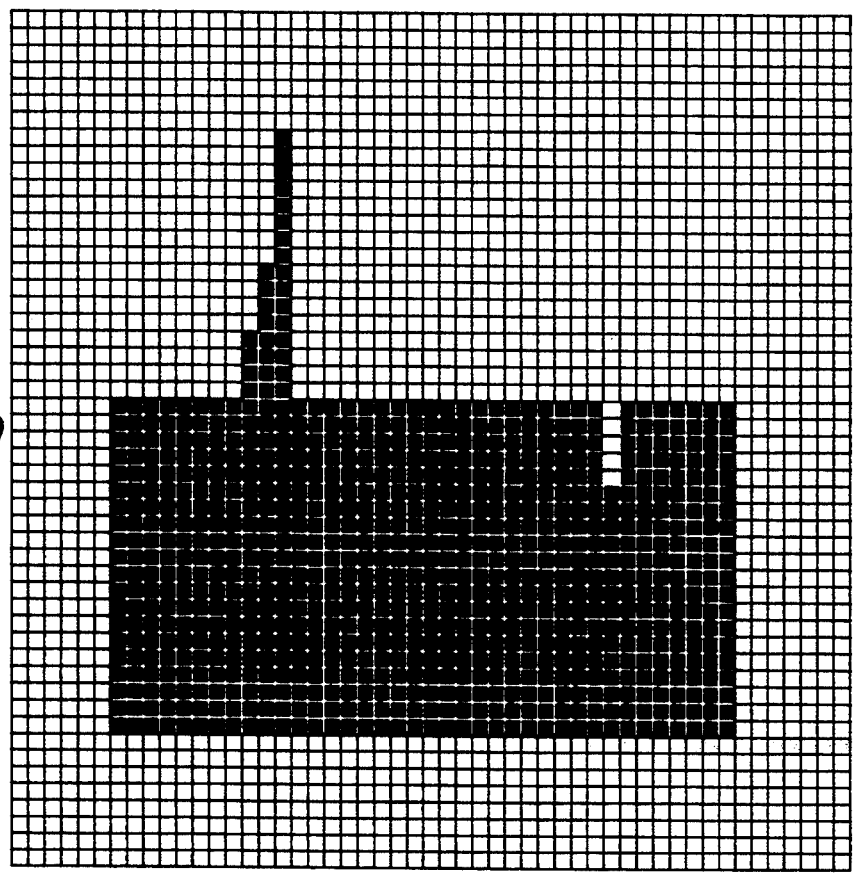
FIG. 19 is a diagram showing an example of a figure obtained by painting the inside of the contour line shown in FIG. 18.

Thus, as will be obvious from the comparison with FIG. 19, it is prevented that the contour line portion is completely painted.

Figure 22:
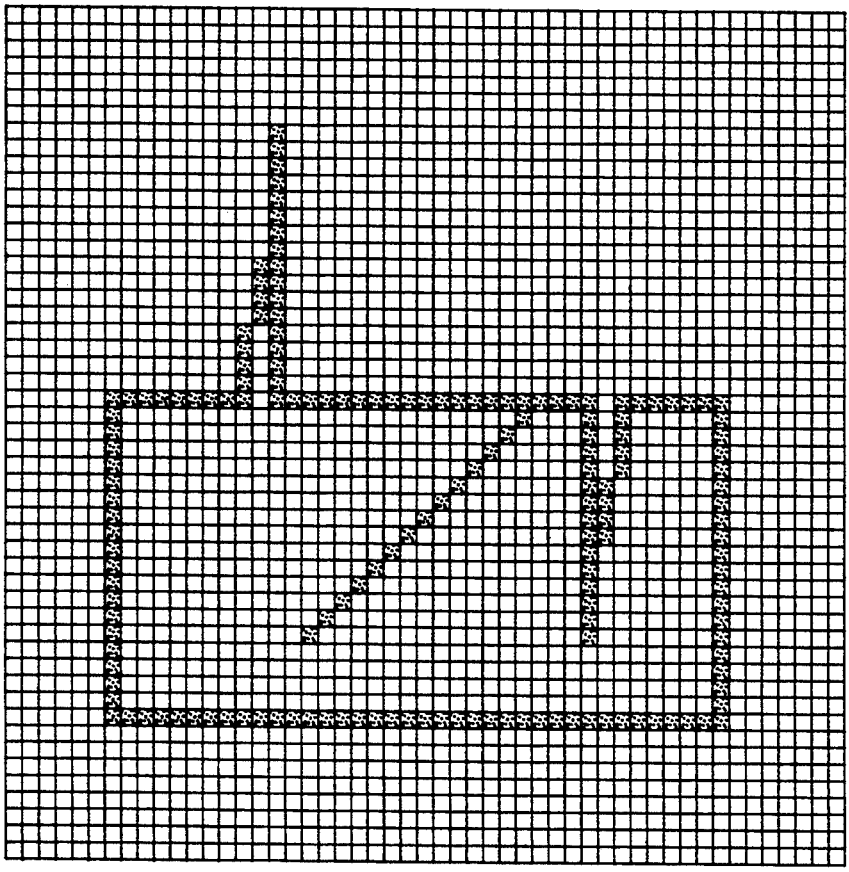
FIG. 22 is a diagram showing an example in the case where the contour line pattern was expressed by half tone.
Figure 23:
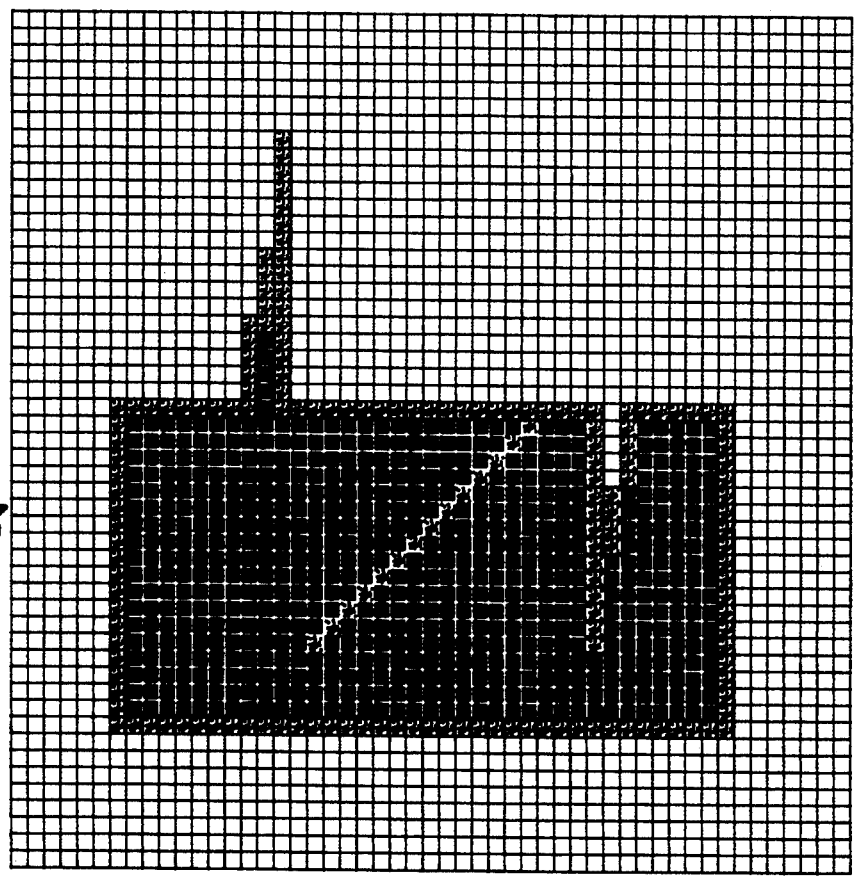
FIG. 23 is a diagram showing the contour line of the pattern in FIG. 19 by the contour line in FIG. 22.

On the other hand, although the correction of the contour line by the dot data has been described in the above embodiment, the invention is not limited to this. For example, for a laser beam printer or the like which outputs after performing the luminance modulation, as shown in FIG. 22, the half tone process is executed to the contour line pattern and by use of this contour line, the contour line of the painted pattern is obtained, so that a contour correction as shown in FIG. 23 can be performed.

In the embodiment, the mesh pattern in which the black and white ratio is 1:1 has been shown as an example of the hatching of the contour line. However, the invention is not limited to this example. A proper mesh pattern may be also set in accordance with the resolution or thickness of output points or the like of the output apparatus.

Third Embodiment

Since the block diagram of an image processing apparatus according to the third embodiment is the same as for the first embodiment, its description is omitted.

Contour correcting processes according to the third embodiment will now be described hereinbelow.

Figure 24:
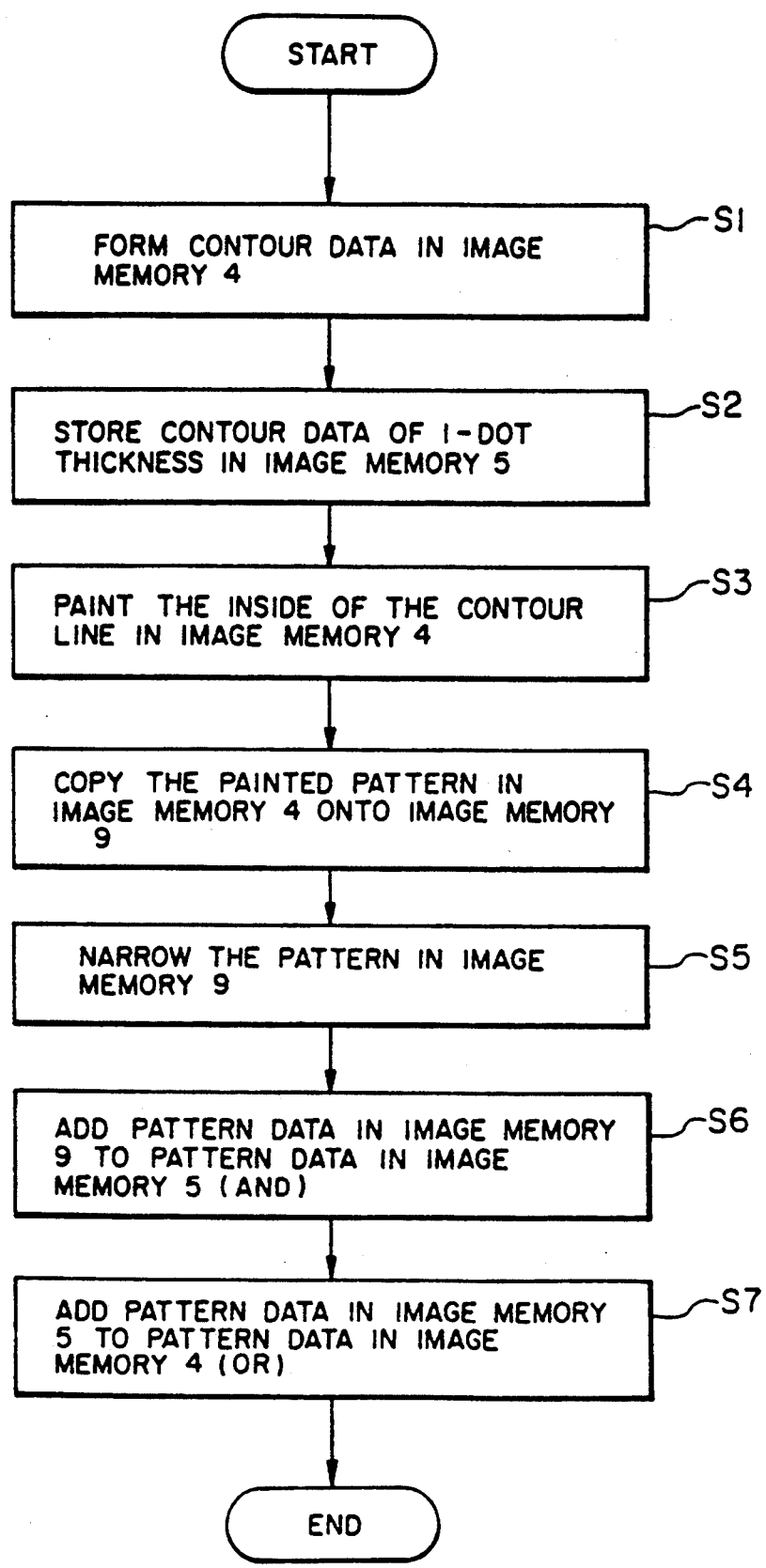
FIG. 24 is a flowchart for contour correcting processes in a third embodiment of the invention.

FIG. 24 is a flowchart for contour correcting processes in the third embodiment.

Figure 25:
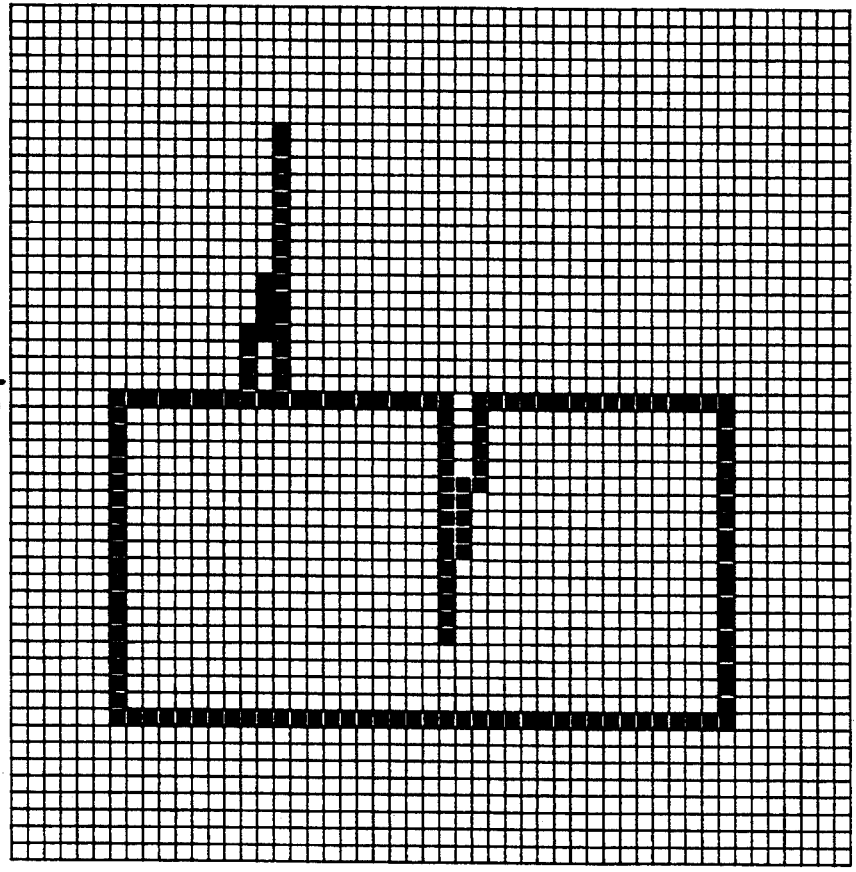
FIG. 25 is a diagram showing an example of a contour line pattern to be corrected.

A contour line is first drawn in the image memory 4 in step S1. A contour line can be made on the basis of the coordinate values which were input from the keyboard 16 or the like or may be also made on the basis of the image data which was input from the disc 2 or 3. In step S2, the data in which a thickness of contour line was set to the value corresponding to one dot in the output dots of the CRT 12 or printer 14 is made in the image memory 5. The resultant data is shown as a contour line pattern in FIG. 25.

Figure 26:
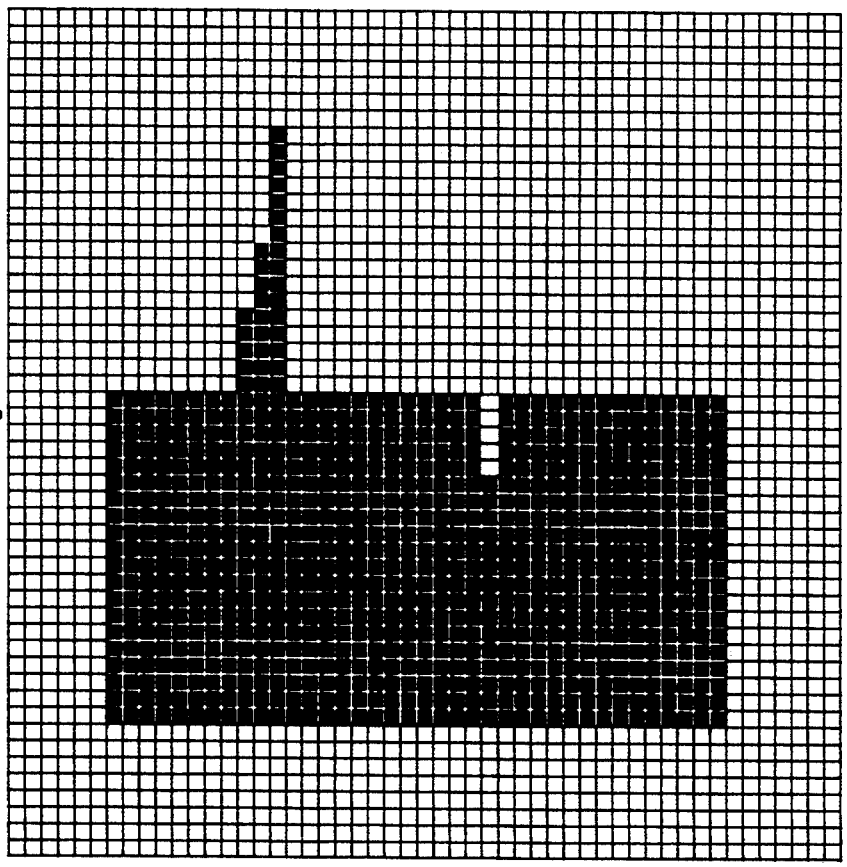
FIG. 26 is a diagram showing a figure in which the inside of the contour line in FIG. 25 was painted.

In the next step S3, the inside of the contour line in the image memory 4 is painted, thereby obtaining pattern data shown in FIG. 26. In step S4, the pattern data painted in step S3 is copied into the image memory 9. Thus, the same pattern data as that in FIG. 26 is derived in the image memory 9.

Figure 27:
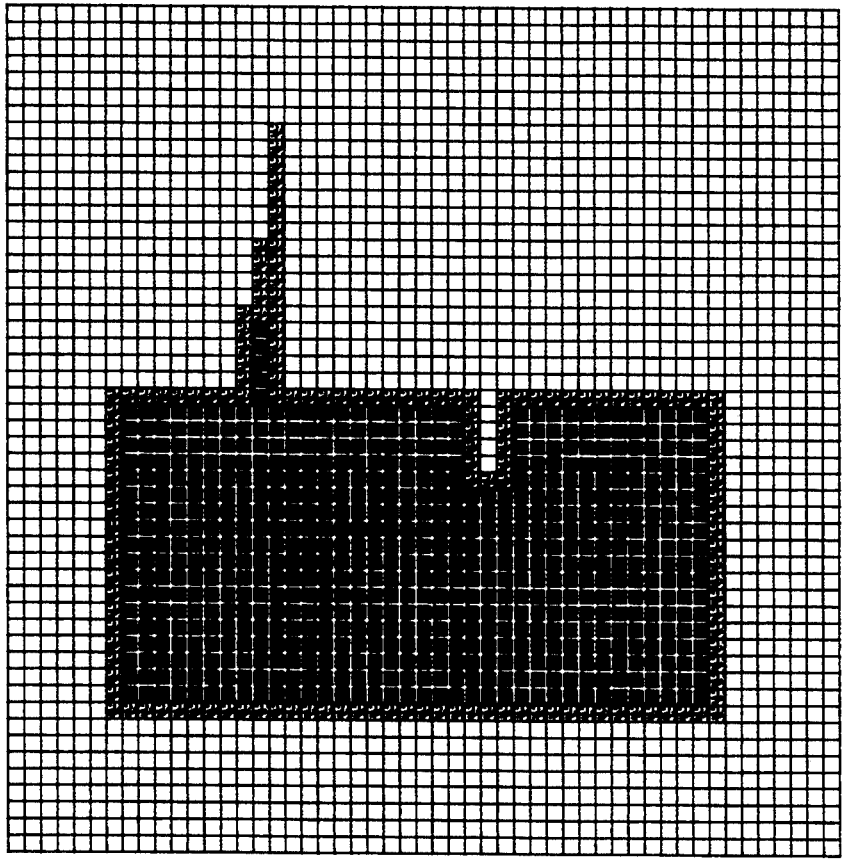
FIG. 27 is a diagram showing a figure obtained by narrowing the figure in FIG. 26.

In step S5, the painted pattern in the image memory 9 is narrowed as mentioned above. Thus, the pattern data in which the pattern was reduced one dot by one along the outer periphery of the painted pattern is derived in the image memory 9 (the resultant pattern data is shown in FIG. 27).

Figure 29:
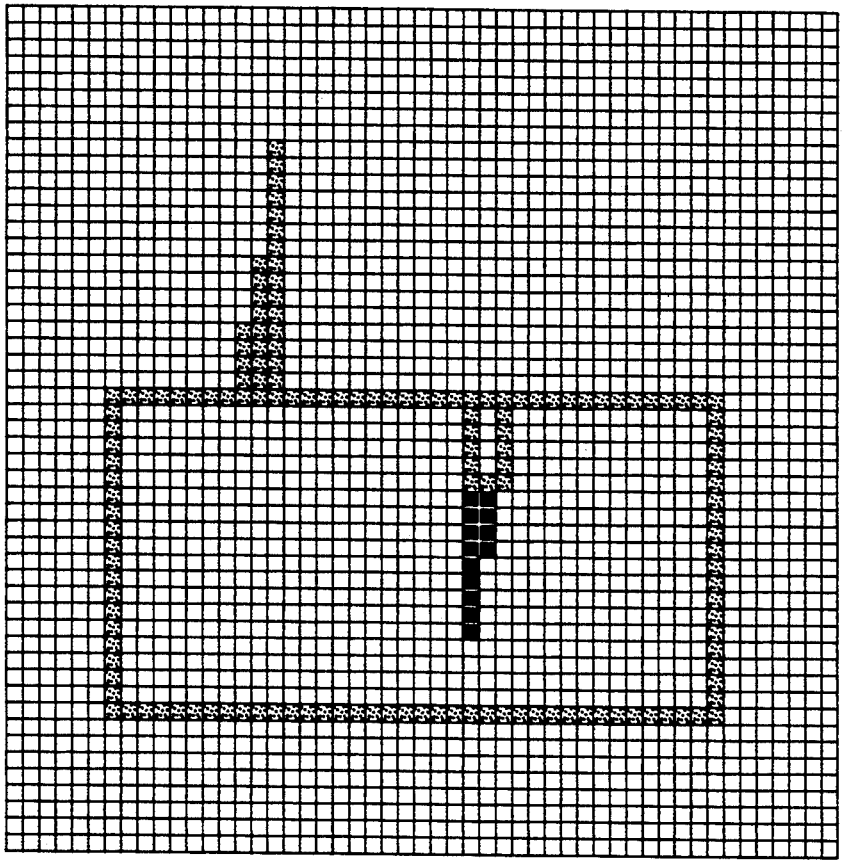
FIG. 29 is a diagram showing an example of a contour line pattern for correction.

In step S6, the AND of the pattern data (FIG. 25) in the image memory 5 and the pattern data (FIG. 27) in the image memory 9 is calculated and the resultant data is stored into the image memory 5. Thus, contour line pattern data for correction shown in FIG. 29 is obtained.

Figure 28:
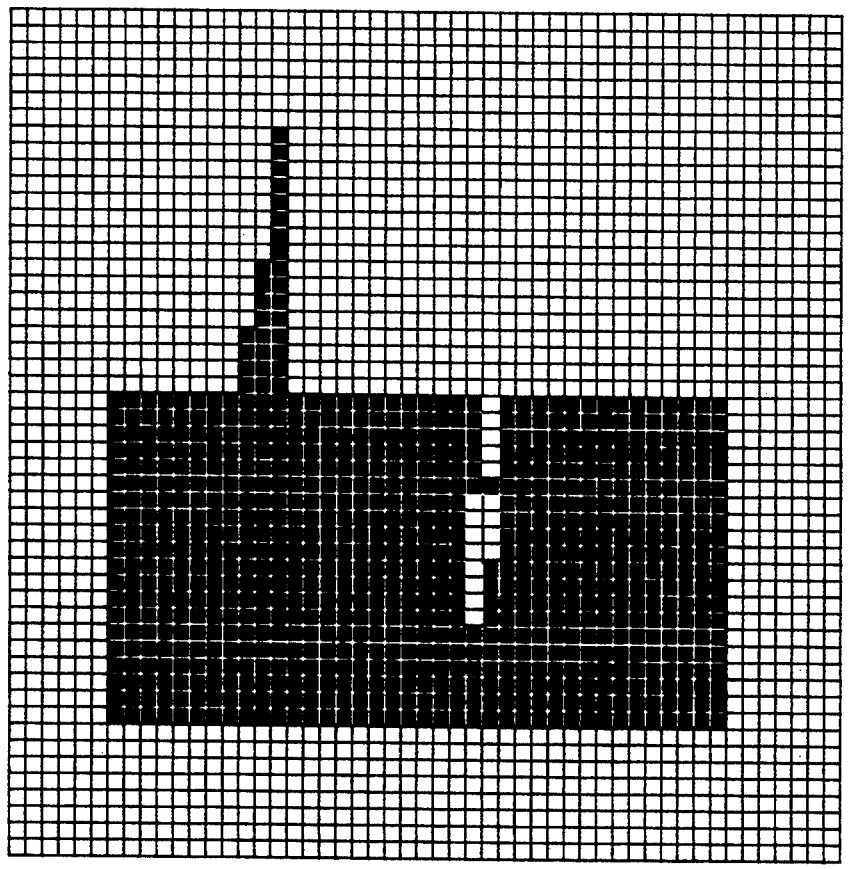
FIG. 28 is a diagram in the case where the contour line of the figure in FIG. 26 was corrected.

In the last step S7, the exclusive-OR of the pattern data (FIG. 26) in the image memory 4 and the contour line pattern data for correction (FIG. 29) in the image memory 5 is calculated and the resultant data is stored into the image memory 4. Finally, pattern data shown in FIG. 28 is obtained.

Thus, it is prevented that the contour line portion is perfectly painted.

Fourth Embodiment

Since a block diagram of an image processing apparatus according to the fourth embodiment is also the same as the first embodiment, its description is omitted.

Figure 30:
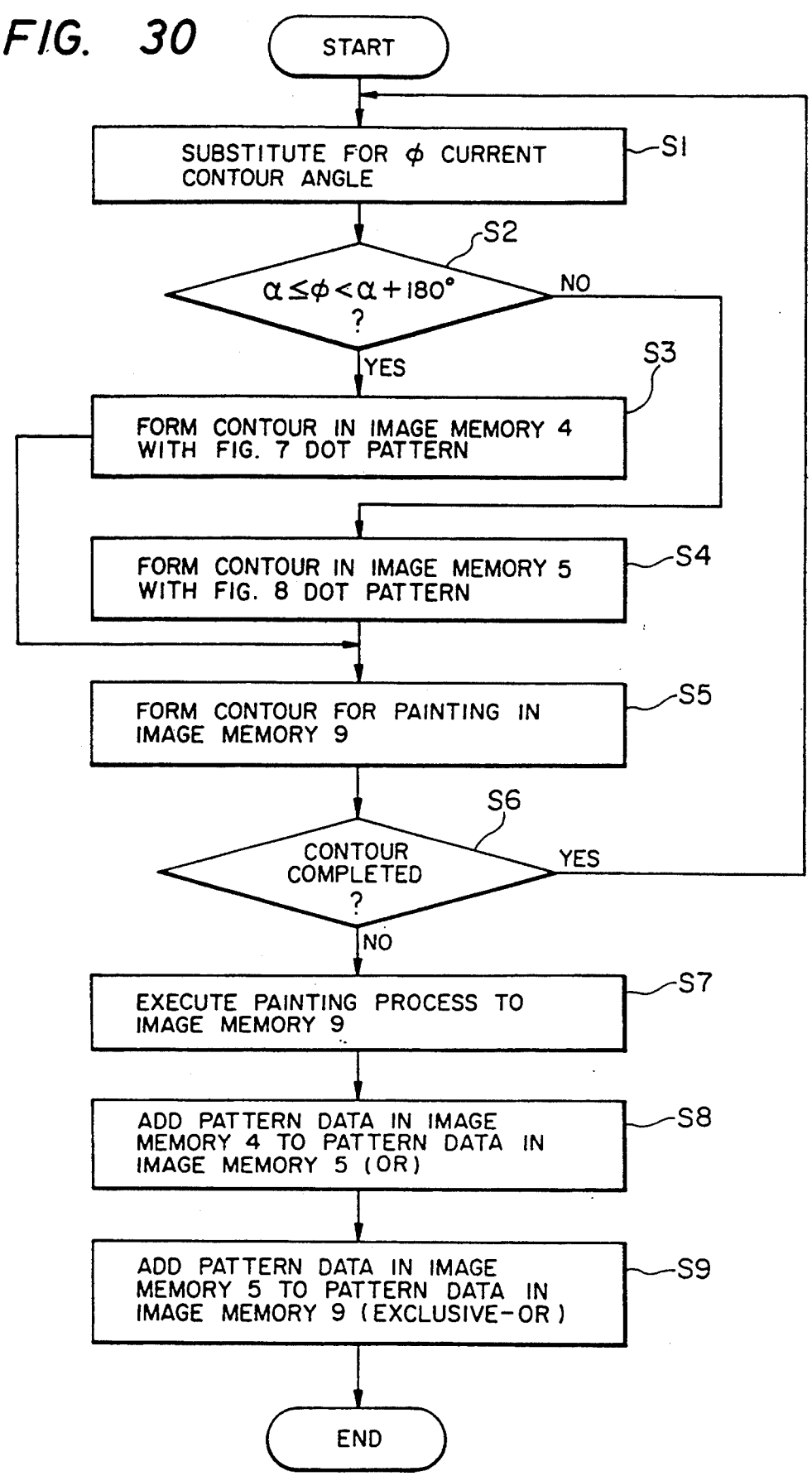
FIG. 30 is a flowchart for contour correcting processes in a fourth embodiment.
Figure 31:
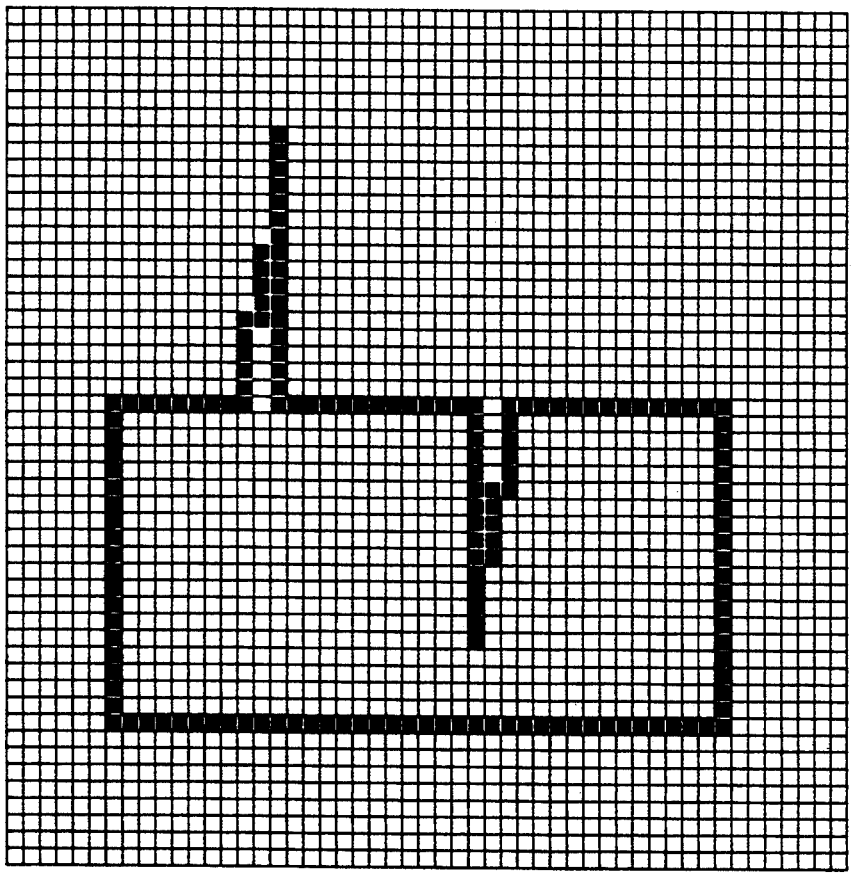
FIG. 31 is a diagram showing an example of a contour line pattern to be corrected.

Contour correcting processes according to the fourth embodiment will now be described hereinbelow. FIG. 30 is a flowchart for the contour correcting processes according to the fourth embodiment.

Figure 32:
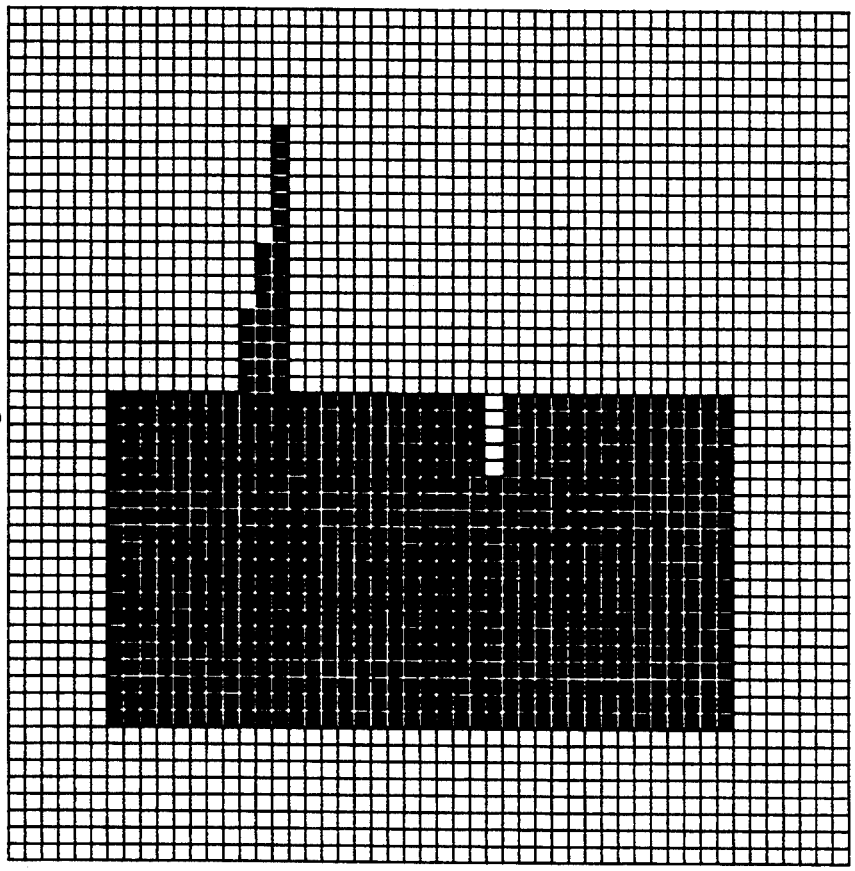
FIG. 32 is a diagram showing a figure obtained by painting the inside of the contour line in FIG. 31.
Figure 33:
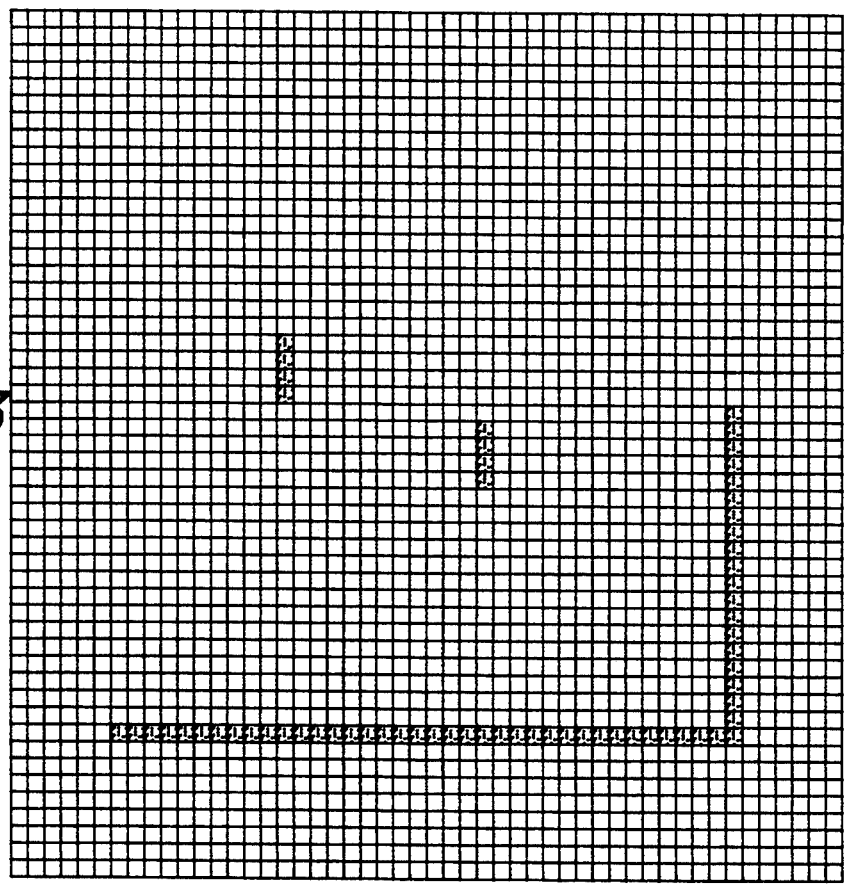
FIG. 33 is a diagram showing a contour line pattern drawn by the pattern in FIG. 35.
Figure 34:
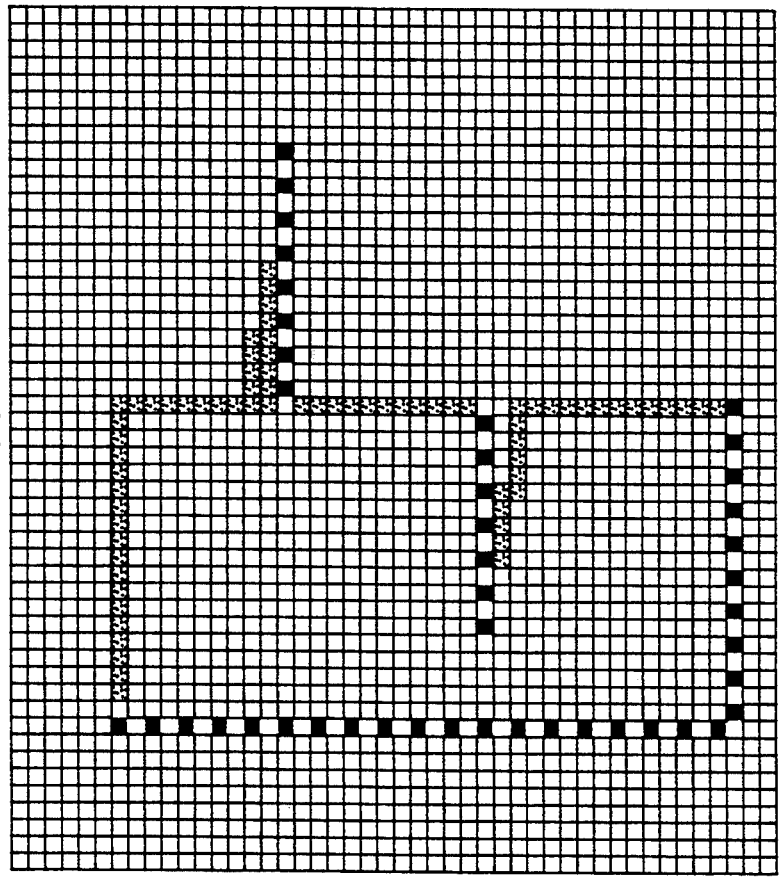
FIG. 34 is a diagram showing a contour line pattern drawn by the pattern in FIG. 36.
Figure 37:
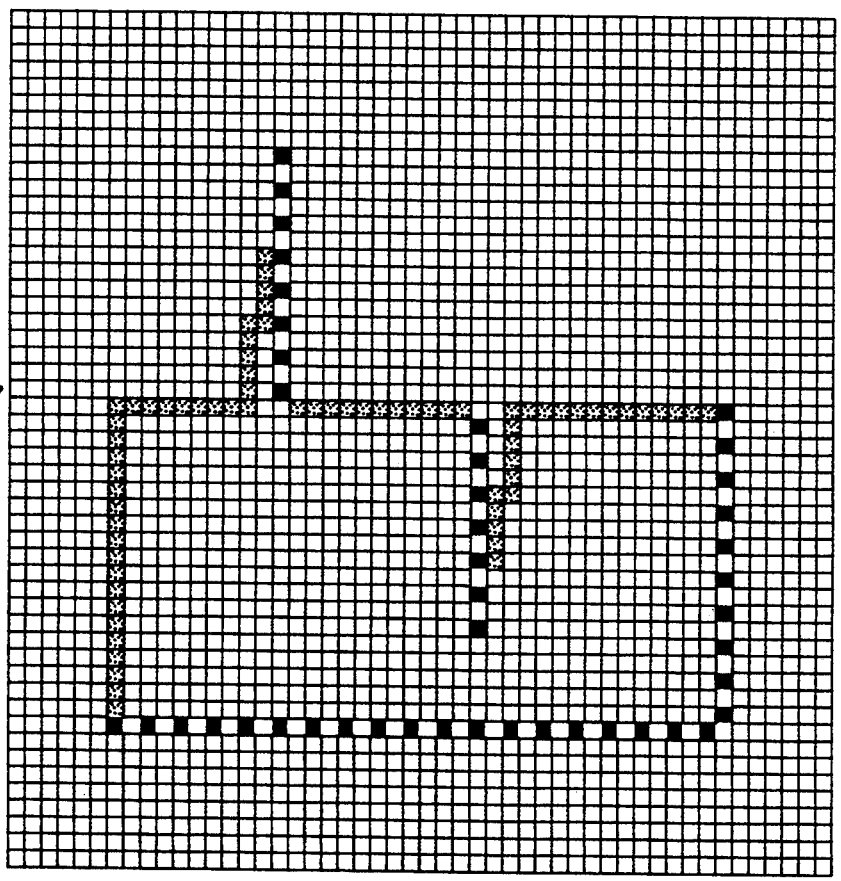
FIG. 37 is a diagram showing a contour line pattern for correction.
Figure 38:
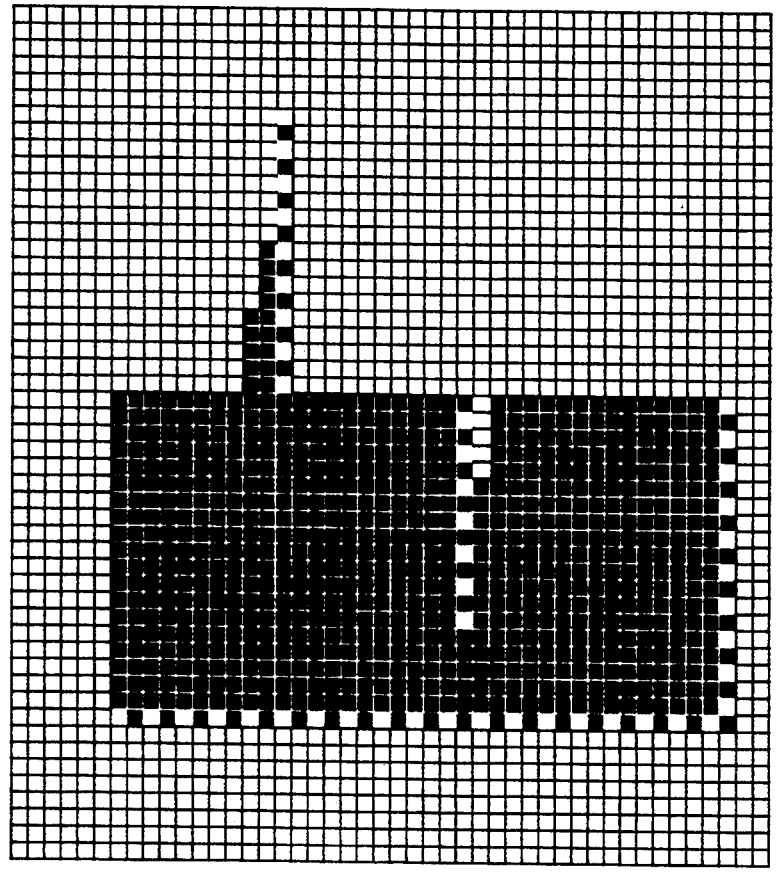
FIG. 38 is a diagram showing an image pattern in the case where the contour line was corrected by the contour line pattern for correction in FIG. 37.

A contour is first drawn in the image memory by dot train which approximates a straight line or curve on the basis of the coordinate values of a given contour line. In this case, the contour line whose drawing direction $\phi$ lies within a range of $\alpha \leq \phi < \alpha + 180°$ (where, $\alpha$ is an initialization value and is set to 0° in this embodiment) is drawn in the image memory 4 by a dot pattern in FIG. 35 (steps S1, S2, S3). A contour line whose drawing direction $\phi$ lies within a range of $180° \leq \phi < 360°$ is drawn in the image memory 5 by a dot pattern in FIG. 36 (steps S1, S2, S4). Thus, the image data in the image memory 4 becomes as shown in FIG. 33 and the image data in the image memory 5 becomes as shown in FIG. 34. Next, a contour line of a figure is drawn in the image memory 9 and the image pattern in the image memory 9 is painted (steps S5, S6, S7), thereby obtaining an image pattern in FIG. 32. Next, the pattern data in the image memory 4 is added to the pattern data in the image memory 5 by the OR (step S8), thereby obtaining an image pattern in FIG. 37. Then, the pattern data in the image memory 5 is added to the painted pattern data in the image memory 9 by the exclusive-OR (step S9). Thus, an image pattern with the corrected contour is derived as shown in FIG. 38. According to this image pattern, since the portion which has conventionally been painted is output as a pattern as shown in FIG. 36, the image pattern is seen as a pattern which is not painted.

Figure 35:
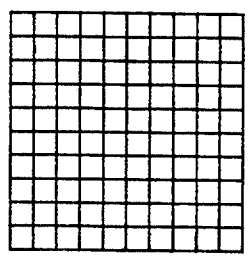
FIG. 35 is a diagram showing an example of a pattern to correct a contour line.
Figure 36:
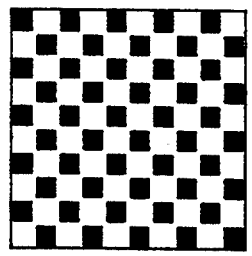
FIG. 36 is a diagram showing an example of another pattern to correct a contour line.
Figure 39A:
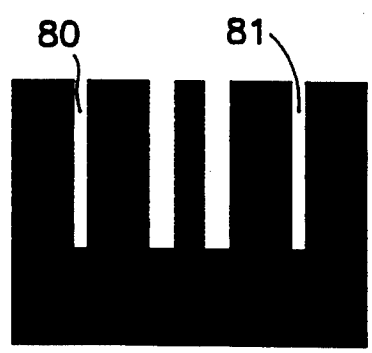
FIGS. 39(a) and 39(b) are diagrams for explaining a conventional drawing of a reduced figure.
Figure 39B:

On the other hand, as dot patterns shown in FIGS. 35 and 36, proper patterns can be also used in accordance with the resolution, thickness of output points, or the like, of the output apparatus. Further, a contour line can be also overlappingly drawn by a proper broken line pattern onto the graphic image which has once been painted.

On the other hand, although the switching angle of the pattern by the drawing direction has been set to two kinds or ranges of values ($0 \leq \phi < 180°$ and $180° \leq \phi < 360°$), the invention is not limited to these values. They can be freely set.

What is claimed is:

1. An image processing apparatus comprising:

a first memory portion;

a second memory portion;

input means for inputting contour line pixel data of image information;

means for making a contour line pattern of the image information on the basis of the contour line pixel data and for storing the contour line pattern in said first memory portion;

means for making a painted pattern in which the inside of the contour line pattern has been painted and for storing the painted pattern in said second memory portion;

cutting means for cutting the contour line pattern out of the painted pattern;

contour line making means for making a corrected contour line pattern and for storing the corrected contour line pattern in said first memory portion; and means for making a corrected painted pattern of the contour line pixel data input by said input means based on an OR of (i) the painted pattern after the contour line pattern has been cut out by said cutting means and (ii) the corrected contour line pattern made by said contour line making means.

2. An apparatus according to claim 1, wherein said contour line making means makes the corrected contour line pattern by utilizing a predetermined mesh-point pattern, and further comprising memory means for storing the predetermined mesh-point pattern.

3. An apparatus according to claim 1, wherein said contour line making means makes the corrected contour line pattern by utilizing a predetermined mesh-point pattern, which is a pattern obtained by thinning out the contour line pattern.

4. An apparatus according to claim 1, wherein said contour line making means masks the contour line pattern using a corresponding predetermined pattern in accordance with an angle of inclination of the contour line pattern, thereby obtaining the corrected contour line pattern.

5. An image processing method comprising the steps of:

inputting contour line pixel data of image information;

making a contour line pattern of the image information on the basis of the contour line pixel data;

storing the contour line pattern;

making a painted pattern in which the inside of the contour line pattern has been painted;

storing the painted pattern;

cutting the contour line pattern out of the painted pattern;

making a corrected contour line pattern;

storing the corrected contour line pattern; and making a corrected painted pattern of the contour line pixel data, based on an OR of (i) the painted pattern after the contour line pattern has been cut out and (ii) the corrected contour line pattern, 6. A method according to claim 5, wherein said step of making a corrected contour line pattern utilizes a predetermined mesh-point pattern, and further comprising the step of storing the predetermined mesh-point pattern.

7. A method according to claim 5, wherein said step of making a corrected contour line pattern utilizes a predetermined mesh-point pattern, which is a pattern obtained by thinning out the contour line pattern.

8. A method according to claim 5, wherein said step of making a corrected contour line pattern utilizes a predetermined mesh-point pattern, which is used in accordance with an angle of inclination of the contour line pattern.

* * * * *

UNITED STATES PATENT AND TRADEMARK OFFICE
CERTIFICATE OF CORRECTION

PATENT NO. : 5,452,372
DATED : September 19, 1995
INVENTOR(S) : AKIFUMI SHIRASAKA ET AL.

It is certified that error appears in the above-indentified patent and that said Letters Patent is hereby corrected as shown below:

<u>COLUMN 1</u>

Line 53, "embodiment;" should read --embodiment of the present invention;--;

Line 55, "of the present invention" should be deleted.

<u>COLUMN 4</u>

Line 7, "$\alpha+180°<\Psi<\alpha+360°,$" should read --$\alpha+180°\leq\Psi<\alpha+360°;$--

<u>COLUMN 5</u>

Line 29, "half tone" should read --half-tone--.

<u>COLUMN 7</u>

Line 7, "line, pattern" should read --line pattern--.

Signed and Sealed this

Thirtieth Day of January, 1996

Attest:

BRUCE LEHMAN

Attesting Officer  Commissioner of Patents and Trademarks